US012598429B2

(12) United States Patent
Pinkerton et al.

(10) Patent No.: US 12,598,429 B2
(45) Date of Patent: Apr. 7, 2026

(54) LOUDSPEAKERS AND METHODS OF USE THEREOF

(71) Applicant: Clean Energy Labs, LLC, Austin, TX (US)

(72) Inventors: Joseph F. Pinkerton, Austin, TX (US); James A. Andrews, Austin, TX (US); David A. Badger, Lago Vista, TX (US)

(73) Assignee: Brane Audio, LLC, Austin, TX (US)

( * ) Notice: Subject to any disclaimer, the term of this patent is extended or adjusted under 35 U.S.C. 154(b) by 464 days.

(21) Appl. No.: 18/319,079

(22) Filed: May 17, 2023

(65) Prior Publication Data

US 2024/0388854 A1 Nov. 21, 2024

(51) Int. Cl.

| | |
|---|---|
| ***H04R 19/02*** | (2006.01) |
| ***H04R 9/02*** | (2006.01) |
| ***H04R 9/04*** | (2006.01) |
| ***H04R 9/06*** | (2006.01) |
| ***H04R 11/02*** | (2006.01) |

(52) U.S. Cl.

CPC ............ *H04R 19/02* (2013.01); *H04R 9/025* (2013.01); *H04R 9/046* (2013.01); *H04R 9/06* (2013.01); *H04R 11/02* (2013.01)

(58) Field of Classification Search

CPC .......... H04R 19/02; H04R 9/06; H04R 9/025; H04R 9/046; H04R 11/02; H04R 1/2888; H04R 11/14; H04R 29/001; H04R 1/2811; H04R 1/28

See application file for complete search history.

(56) References Cited

U.S. PATENT DOCUMENTS

| | | | | |
|---|---|---|---|---|
| 7,856,115 | B2 * | 12/2010 | Clair | H04R 9/063 381/403 |
| 12,003,943 | B2 * | 6/2024 | Pinkerton | H04R 9/025 |
| 2020/0112793 | A1 * | 4/2020 | Børresen | H04R 7/16 |

FOREIGN PATENT DOCUMENTS

| | | | | |
|---|---|---|---|---|
| CN | 2072300 U | * | 2/1991 | |
| WO | WO-2021150278 A1 | * | 7/2021 | H04R 17/00 |

* cited by examiner

*Primary Examiner* — Sunita Joshi

(74) *Attorney, Agent, or Firm* — DICKINSON WRIGHT PLLC; Ross Spencer Garsson

(57) ABSTRACT

Electroacoustic drivers that can be utilized in loudspeaker systems that utilize drivers having a magnetic negative spring (MNS). The magnets of the MNS can be arranged for radial stability and/or to provide for linear magnetic forces. A variable reluctance device can be used to vary the resonant frequency of electroacoustic driver in response to a feedback signal.

28 Claims, 20 Drawing Sheets

LOUDSPEAKERS AND METHODS OF USE THEREOF

RELATED PATENTS/PATENT APPLICATIONS

This application is related to U.S. patent application Ser. No. 18/319,113, filed concurrent herewith, to Joseph F. Pinkerton et al., entitled "Loudspeakers And Methods of Use Thereof," (the "Pinkerton 61001 Application"). The Pinkerton 61001 Application is incorporated herein in its entirety for all purposes.

This application is also related to International Patent Application No. PCT/US2020/051633, filed Sep. 18, 2020, to Joseph F. Pinkerton et al., entitled "Electroacoustic Drivers And Loudspeakers Containing Same," (the "Pinkerton '633 PCT Application"). The Pinkerton '633 PCT Application is incorporated herein in its entirety for all purposes.

This application is also related to International Patent Application No. PCT/US2022/041747, filed Aug. 26, 2023, to Joseph F. Pinkerton et al., entitled "Loudspeakers And Methods Of Use Thereof," (the "Pinkerton '747 PCT Application"). The Pinkerton '747 PCT Application is incorporated herein in its entirety for all purposes.

TECHNICAL FIELD

The present invention relates to loudspeakers and methods of use thereof, and in particular loudspeakers having drivers including a magnetic negative spring (MNS) (such as repel-attract drivers (RAD)).

BACKGROUND

FIG. 1 is a prior art audio force transducer 100 that includes a fixed magnetic flux path 101 (soft iron) having permanent magnets 102 and a sliding coil holder (also called an "armature") 103 having electric coil (also called a "voice coil") 104. The permanent magnets 102 are separated from the electric coil 104 with an air gap 105. The magnetic forces will cause the coil holder 103 to slide inward and outward in the z-axis direction (as shown in FIG. 1), which moves the panels of the loudspeakers (not shown) to produce the auditory sound.

As disclosed and taught in Pinkerton '633 PCT Application, large pressure forces on a sound panel (of an audio speaker) can be cancelled, or partially cancelled, by using a magnetic negative spring (MNS) as part of a repel-attract driver (RAD) (also known as a reluctance assist driver) or a permanent magnet crown (PMC) driver.

FIG. 2A (which is FIG. 18D of the Pinkerton '633 PCT Application) shows a perspective view showing certain parts (mainly the permanent magnets) of a repulsive/attractive MNS. FIG. 2B shows a perspective view of the armature that was utilized in the repulsive/attractive MNS shown in FIG. 2A.

As shown in FIGS. 2A-2B (which provides movement of the coil holder along the z-direction), one pole width of the voice coils 1815*a*-1815*b* are always immersed in the magnetic field (which makes the force per unit current input approximately constant at all armature positions).

The repulsive/attractive MNS shown in FIGS. 2A-2B has stationary magnetic poles (such as stationary magnetic north poles 1801*a*-1804*a* and stationary magnetic south poles 1801*b*-1804*b*), which are made with permanent magnets (in place of steel) and so the oppositely polarized moving magnets (such as moving magnetic north poles 1805*a*-1806*a* and moving magnetic south poles 1805*b*-1806*b*) on the armature are radially repelled by the stationary magnet poles (which provides radial stability). As shown in FIGS. 2A-2B, the stationary magnetic poles are permanent magnet rings (PMRs) and the moving magnetic poles are permanent magnetic triangles (PMTs). Alternatively, permanent magnet arc segments can be used in place of PMTs. The PMR could be an assemblage of arc segments that, when combined, create a ring magnet structure.

When the armature is in the centered position (as shown in FIG. 2C, which is FIG. 18A of the Pinkerton '633 PCT Application), the positive z-direction array of PMTs (moving magnetic north pole 1806*a* and moving magnetic south pole 1806*b*) is immersed in the oppositely directed magnetic field of the positive z-direction PMR (stationary magnetic north poles 1802*a* and 1804*a* and stationary magnetic south poles 1802*b* and 1804*b*) and thus is radially stable.

When the armature is in the partial negative z-direction position (as shown in FIG. 2D, which is FIG. 18B of the Pinkerton '633 PCT Application), this position the positive z-direction array of PMT (moving magnetic north pole 1806*a* and moving magnetic south pole 1806*b*) is partially immersed in the oppositely directed magnetic field of the positive z-direction PMR (stationary magnetic north poles 1802*a* and 1804*a* and stationary magnetic south poles 1802*b* and 1804*b*) and still radially stable. The axial/desired force in this position is high because the positive z-direction array of PMT (moving magnetic north pole 1806*a* and moving magnetic south pole 1806*b*) is being repelled by the positive z-direction PMR (stationary magnetic north poles 1802*a* and 1804*a* and stationary magnetic south poles 1802*b* and 1804*b*) and attracted by the magnetic fringing fields of negative z-direction PMR (stationary magnetic north poles 1801*a* and 1803*a* and stationary magnetic south poles 1801*b* and 1803*b*).

When the armature is in the full negative z-direction position (as shown in FIG. 2E, which is FIG. 18C of the Pinkerton '633 PCT Application), the positive z-direction array of PMT (moving magnetic north pole 1806*a* and moving magnetic south pole 1806*b*) is not immersed in the oppositely directed magnetic field of the positive z-direction PMR (stationary magnetic north poles 1802*a* and 1804*a* and stationary magnetic south poles 1802*b* and 1804*b*), but is partially immersed in the magnetic fringing field of the negative z-direction PMR (stationary magnetic north poles 1801*a* and 1803*a* and stationary magnetic south poles 1801*b* and 1803*b*) and this position still provides some radially stability. The axial/desired force in the position shown in FIG. 18C is also high because the positive z-direction array of PMTs is being repelled by the positive z-direction PMR magnetic fringing field and attracted by the negative z-direction PMR.

By symmetry, this same stability will be provided when the armature moves in the positive z-direction.

This provides a radial stabilizing force that helps to keep the armature centered within the air gap between the inner and outer permanent magnet rings.

FIG. 3 (which is FIG. 20 of the Pinkerton '633 PCT Application) shows a loudspeaker 2000 in which an MNS (such as shown in FIGS. 2A-2B) can be utilized. Loudspeaker 2000 has a sealed chamber (or sealed enclosure) 2001, a movable panel 2002 (which is connected to a flexible "surround" element 2005, such as made from rubber to allow movable panel 2002 to move in the positive and negative z-direction). Loudspeaker 2000 further includes MNS 2003, and voice coil 2004, which are positioned for moving movable panel 2002 in the positive and negative z-direction. Loudspeaker 2000 further includes sensor 2006

(such as position and/or velocity sensor, that can be an optical or inductive sensor) used to provide position or velocity feedback to a control circuit). In the orientation of FIG. 3 (shown by the x-z axis shown therein, with the y-direction perpendicular thereto), movable sound panel 2002 moves outward and inward in the z-direction due to the z-direction movement of the armature. Such movement occurs due to the magnetic forces generated thereby.

When the sound panel is in its neutral/relaxed position, there are no forces acting on movable sound panel 2002. When movable sound panel 2002 moves in the positive z-direction, this creates a partial vacuum (i.e., a decrease in pressure) in sealed chamber 2001. When movable sound panel 2002 moves in the negative z-direction, this creates an increased pressure in sealed chamber 2001. Thus, there are additional forces that are created by this movement due to the decrease/increase in pressure.

Certain issues have arisen for loudspeakers having drivers including a magnetic negative spring (MNS) (such as repel-attract drivers (RAD) and permanent magnet crown (PMC) drivers). For instance, radial instability has resulted in the RAD armature contacting the RAD stator magnets and making a loud knocking sound (which is obviously undesirable for a loudspeaker device). Furthermore, the RAD force vs displacement curve has been non-linear and thus can result in audible distortions in the speaker sound output. Still further, the inner stator magnet arc segments have overcome epoxy bonds and broken free. Also, it has been discovered that operating a RAD-based speaker at altitudes above about 2000 feet can prevent the RAD from working. And, when the RAD is off and in its off/resting position it can create an asymmetry in the "spider" support force (that limits displacement and can cause instabilities).

Accordingly, needs exist for an improved loudspeakers having drivers including a magnetic negative spring (MNS) (such as repel-attract drivers (RAD) and permanent magnet crown (PMC) drivers) to address these issues.

SUMMARY OF THE INVENTION

The present invention is directed to loudspeakers and methods of use thereof, and in particular loudspeakers having drivers including a magnetic negative spring (MNS) (such as repel-attract drivers (RAD) and permanent magnet crown (PMC) drivers). In some embodiments, the magnets of the MNS are arranged for radial stability and/or to provide for linear forces. In some embodiments, a variable air volume or variable reluctance device is used to vary the resonance frequency of the loudspeaker.

In general, in one aspect, the invention features a loudspeaker. The loudspeaker includes an enclosure. The loudspeaker further includes a sound panel mechanically connected to the enclosure. The loudspeaker further includes a moveable armature mechanically connected to the sound panel including an actuator operable to convert electrical energy into mechanical energy. The moveable armature is operable for moving the sound panel toward the enclosure to create a first air pressure force and away from the enclosure to create a second air pressure force. The loudspeaker further includes a magnetic negative spring that has a first magnetic negative spring portion that is mechanically connected to the moveable armature and a second magnetic negative spring portion that is stationary relative to the enclosure. The magnetic negative spring is operable to provide a first magnetic negative spring force when the sound panel is moving toward the enclosure and a second magnetic negative spring force when the sound panel is moving away from the enclosure. The first magnetic negative spring force is oppositely directed to the first air pressure force. The second magnetic negative spring force is oppositely directed to the second air pressure force. The first magnetic negative spring portion includes a first armature magnet with a first axial midpoint and a second armature magnet with a second axial midpoint. The first armature magnet and the second armature magnet are spaced apart by a first axial distance. The second magnetic negative spring portion includes a first ring magnet with a third axial midpoint and a second ring magnet with a fourth axial midpoint. The first ring magnet and the second ring magnet are spaced apart by a second axial distance. The first axial distance is greater than the second axial distance. The axial distance between the first axial midpoint and the second axial midpoint is less than the axial distance between the third axial midpoint and fourth axial midpoint.

Implementations of the invention can include one or more of the following features:

The enclosure can be a sealed enclosure.

The actuator can be a voice coil.

The voice coil and the magnetic negative spring can share the same magnetic circuit.

The actuator can be an electromagnet.

The loudspeaker can further include a position sensor that senses the position of the sound panel.

The position sensor can be an infrared position sensor.

The first ring magnet can include an inner first ring magnet and an outer first ring magnet. The inner first ring magnet can have a smaller radius than the outer first ring magnet.

The second ring magnet can include an inner second ring magnet and an outer second ring magnet. The second inner ring magnet can have a smaller radius than the second outer second ring magnet.

The inner first ring magnet and the inner second ring magnet can be connected to a ferromagnetic element.

The inner first ring magnet and the inner second ring magnet can include arc segments.

The inner first ring magnet and the inner second ring magnet can each have an inner radius portion and an outer radius portion. The inner radius portion can have a first axial length. The outer radius portion can have a second axial length. The first axial length can be greater than the second axial length.

The loudspeaker can further include at least one mechanical locking element that secures the inner first ring magnet and the inner second ring magnet to the ferromagnetic element.

The outer first ring magnet and outer second ring magnet can be connected to a ferromagnetic element.

The first armature permanent magnet can include a first array of arc-shaped elements. The second armature permanent magnet can include a second array of arc-shaped elements.

The first armature permanent magnet can be repelled by the first radially polarized ring magnet and attracted to the second radially polarized ring magnet. The second armature permanent magnet can be attracted to the first radially polarized ring magnet and repelled by the second radially polarized ring magnet.

The loudspeaker can further include an armature centering mechanism.

The loudspeaker can further include a ring of ferromagnetic material. The first ring magnet and the second ring magnet can be mechanically attached to the ring of ferromagnetic material.

The magnetic negative spring can produce a peak force of over 100 Newtons.

The first armature magnet can have a first force-displacement curve having a first correlation coefficient. The second armature magnet can have has a second force-displacement curve having a second correlation coefficient. The sum of the first force-displacement curve and the second force-displacement curve can have a third correlation coefficient. The absolute value of the third correlation coefficient can be greater than the absolute value of the first correlation coefficient. The absolute value of the third correlation coefficient can be greater than the absolute value of the second correlation coefficient.

The first armature magnet can create a first force when the sound panel is moving away from the enclosure. The second armature magnet can create a second force when the sound panel is moving away from the enclosure. The absolute value of the first force can be greater than the absolute value of the second force.

The absolute value of the first force can be on average greater than twice the absolute value of the second force when the sound panel moves away from the enclosure from its centered position to its maximum outward excursion.

The first armature magnet can create a first force when the sound panel is moving toward the enclosure. The second armature magnet can create a second force when the sound panel is moving toward the enclosure. The absolute value of the first force can be less than the absolute value of the second force.

The absolute value first force can be on average less than half the absolute value of the second force when the sound panel moves toward the enclosure from its centered position to its maximum inward excursion.

The first armature magnet can create a first force when the armature is centered. The second armature magnet can create a second force when the armature is centered. The first force can be equal in magnitude and opposite in direction to the second force.

The loudspeaker can further include two axially spaced apart flexible supports.

The first armature magnet can have a first armature magnet inner edge and a first armature magnet outer edge. The first ring magnet can have a first ring magnet inner edge and a first ring magnet outer edge. The second armature magnet can have a second armature magnet inner edge and a second armature magnet outer edge. The second ring magnet can have a second ring magnet inner edge and a second ring magnet outer edge. The distance between the first armature magnet inner edge and the second ring magnet inner edge can be approximately equal to the distance between the first armature magnet outer edge and the first ring magnet outer edge.

The distance between the second armature inner edge and the first ring magnet inner edge can be approximately equal to the distance between the second armature magnet outer edge and the second ring magnet outer edge.

In general, in another aspect, the invention features a loudspeaker. The loudspeaker includes an enclosure. The loudspeaker further includes a sound panel mechanically connected to the enclosure. The loudspeaker further includes a moveable armature mechanically connected to the sound panel comprising a voice coil. The moveable armature is operable for moving the sound panel toward the enclosure to create a first air pressure force and away from the enclosure to create a second air pressure force. The loudspeaker further includes a magnetic negative spring that has a first magnetic negative spring portion that is mechanically connected to the moveable armature and a second magnetic negative spring portion that is stationary relative to the enclosure. The magnetic negative spring is operable to provide a first magnetic negative spring force when the sound panel is moving toward the enclosure and a second magnetic negative spring force when the sound panel is moving away from the enclosure. The first magnetic negative spring force is oppositely directed to the first air pressure force. The second magnetic negative spring force is oppositely directed to the second air pressure force. The first magnetic negative spring portion includes a first armature magnet and a second armature magnet. The first armature magnet and the second armature magnet are oppositely polarized. The second magnetic negative spring portion includes a closed magnetic circuit that includes a first ring magnet, a second ring magnet and a ferromagnetic element. The ferromagnetic element includes a moveable ferromagnetic plunger that is operable to change the reluctance of the closed magnetic circuit in response to a feedback signal.

Implementations of the invention can include one or more of the following features:

The enclosure can be a sealed enclosure.

The feedback signal can be derived from a pressure sensor.

The feedback signal can be derived from a voice coil resonant frequency algorithm.

The feedback signal can be derived from a song file.

An algorithm can scan the song file to determine the primary low frequency note and instructs the ferromagnetic plunger to move to a position that causes the voice coil resonant frequency to be near the frequency of the primary low frequency note.

The moveable ferromagnetic plunger can be moved only when music is being played.

The moveable ferromagnetic plunger can be moved by an electric motor.

The moveable ferromagnetic plunger can include a moveable sound panel landing pad.

The moveable ferromagnetic plunger can be near a maximum reluctance position when the sound panel is resting on the sound panel landing pad.

The voice coil and the magnetic negative spring can share the same magnetic circuit.

The loudspeaker can further include a position sensor that senses the position of the sound panel.

The feedback signal can be derived from the position sensor.

The position sensor can be an infrared position sensor.

The first ring magnet can include an inner first ring magnet and an outer first ring magnet. The inner first ring magnet can have a smaller radius than the outer first ring magnet.

The second ring magnet can include an inner second ring magnet and an outer second ring magnet. The second inner ring magnet can have a smaller radius than the second outer second ring magnet.

The inner first ring magnet and the inner second ring magnet can be connected to a ferromagnetic element.

The inner first ring magnet and the inner second ring magnet can include arc segments.

The inner first ring magnet and the inner second ring magnet can each have an inner radius portion and an outer radius portion. The inner radius portion can have a first axial length. The outer radius portion can have a second axial length. The first axial length can be greater than the second axial length.

The loudspeaker can further include at least one mechanical locking element that secures the inner first ring magnet and the inner second ring magnet to the ferromagnetic element.

The outer first ring magnet and the outer second ring magnet can be connected to a ferromagnetic element.

The first armature permanent magnet can include a first array of arc-shaped elements. The second armature permanent magnet can include a second array of arc-shaped elements.

The first armature permanent magnet can be repelled by the first radially polarized ring magnet and attracted to the second radially polarized ring magnet. The second armature permanent magnet can be attracted to the first radially polarized ring magnet and repelled by the second radially polarized ring magnet.

The loudspeaker can further include an armature centering mechanism.

The centering mechanism can include a pump and a valve.

The loudspeaker can further include a ring of ferromagnetic material. The first ring magnet and the second ring magnet can be mechanically attached to the ring of ferromagnetic material.

The magnetic negative spring can produce a peak force of over 100 Newtons.

The first armature magnet can have a first force-displacement curve having a first correlation coefficient. The second armature magnet can have a second force-displacement curve having a second correlation coefficient. The sum of the first force-displacement curve and the second force-displacement curve can have a third correlation coefficient. The absolute value of the third correlation coefficient can be greater than the absolute value of the first correlation coefficient. The absolute value of the third correlation coefficient can be greater than the absolute value of the second correlation coefficient.

The first armature magnet can create a first force when the sound panel is moving away from the enclosure. The second armature magnet can create a second force when the sound panel is moving away from the enclosure. The absolute value of the first force can be greater than the absolute value of the second force.

The absolute value first force can be on average greater than twice the absolute value of the second force when the sound panel moves away from the enclosure from its centered position to its maximum outward excursion.

The first armature magnet can create a first force when the sound panel is moving toward the enclosure. The second armature magnet can creates a second force when the sound panel is moving toward the enclosure. The absolute value of the first force can be less than the absolute value of the second force.

The absolute value first force can be on average less than half the absolute value of the second force when the sound panel moves toward the enclosure from its centered position to its maximum inward excursion.

The first armature magnet can create a first force when the armature is centered. The second armature magnet can create a second force when the armature is centered. The first force can be equal in magnitude and opposite in direction to the second force.

In general, in another aspect, the invention features

Implementations of the invention can include one or more of the following features:

In general, in another aspect, the invention features

Implementations of the invention can include one or more of the following features:

In general, in another aspect, the invention features

Implementations of the invention can include one or more of the following features:

DESCRIPTION OF DRAWINGS

FIG. 10A is a frontal view of the loudspeaker. FIG. 10B is a cross-sectional view along A-A.

DETAILED DESCRIPTION

The present invention is directed to loudspeakers and methods of use thereof, and in particular loudspeakers having drivers including a magnetic negative spring (MNS) (such as repel-attract drivers (RAD) and permanent magnet crown (PMC) drivers). In some embodiments, the magnets of the MNS are arranged for radial stability and/or to provide for linear axial forces. In some embodiments, a variable air volume device or variable reluctance device is used to vary the resonance frequency of the loudspeaker.

Radial Stability

Radial instability has resulted in the RAD armature contacting the RAD stator magnets and making a loud knocking sound (which is clearly undesirable for a loudspeaker device).

Figure 1:
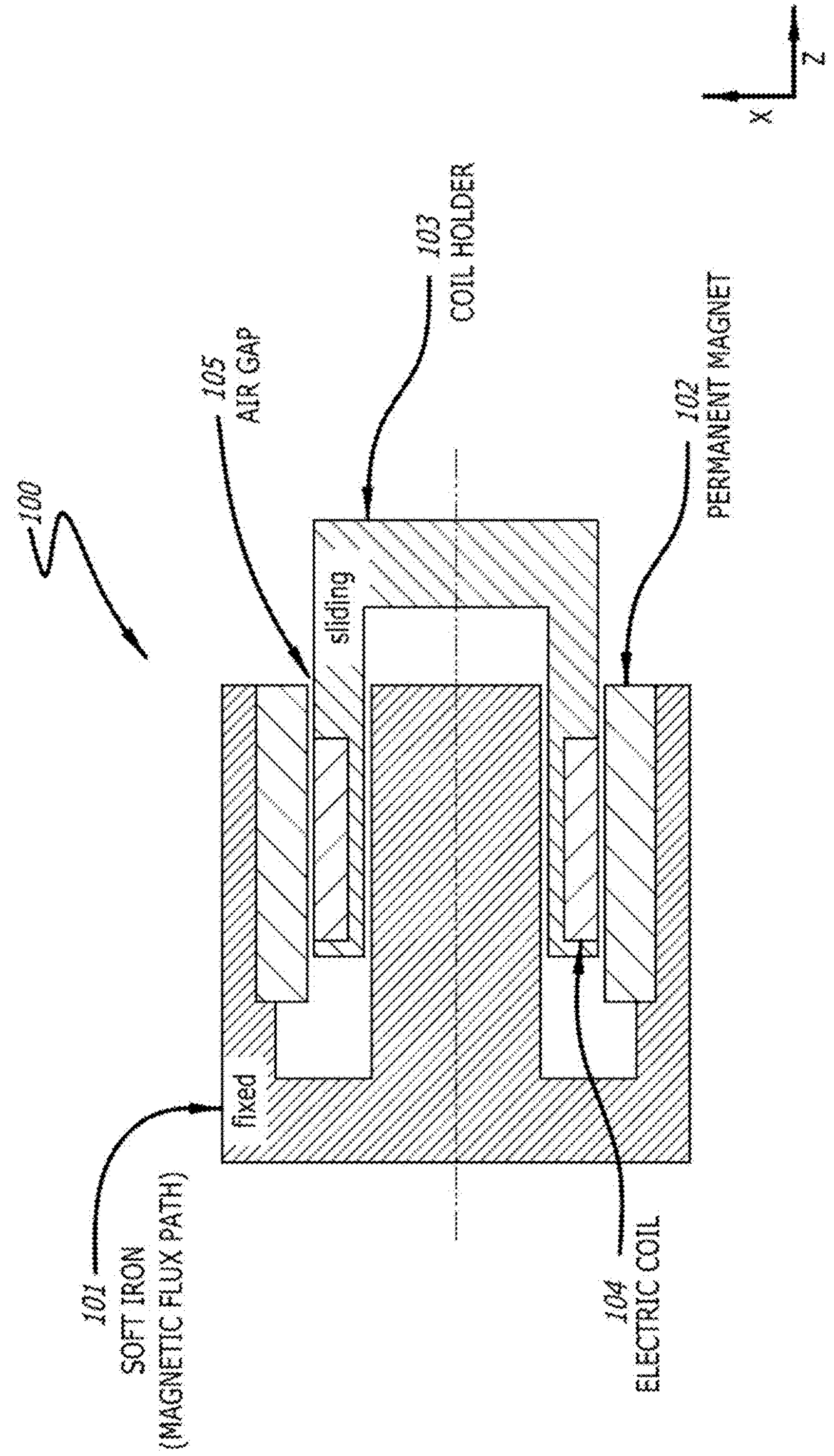
FIG. 1 (prior art)
FIG. 1 (which is FIG. 1 of the Pinkerton '633 PCT Application) is a schematic of a cross-sectional view of a prior art audio force transducer.
Figure 2A:
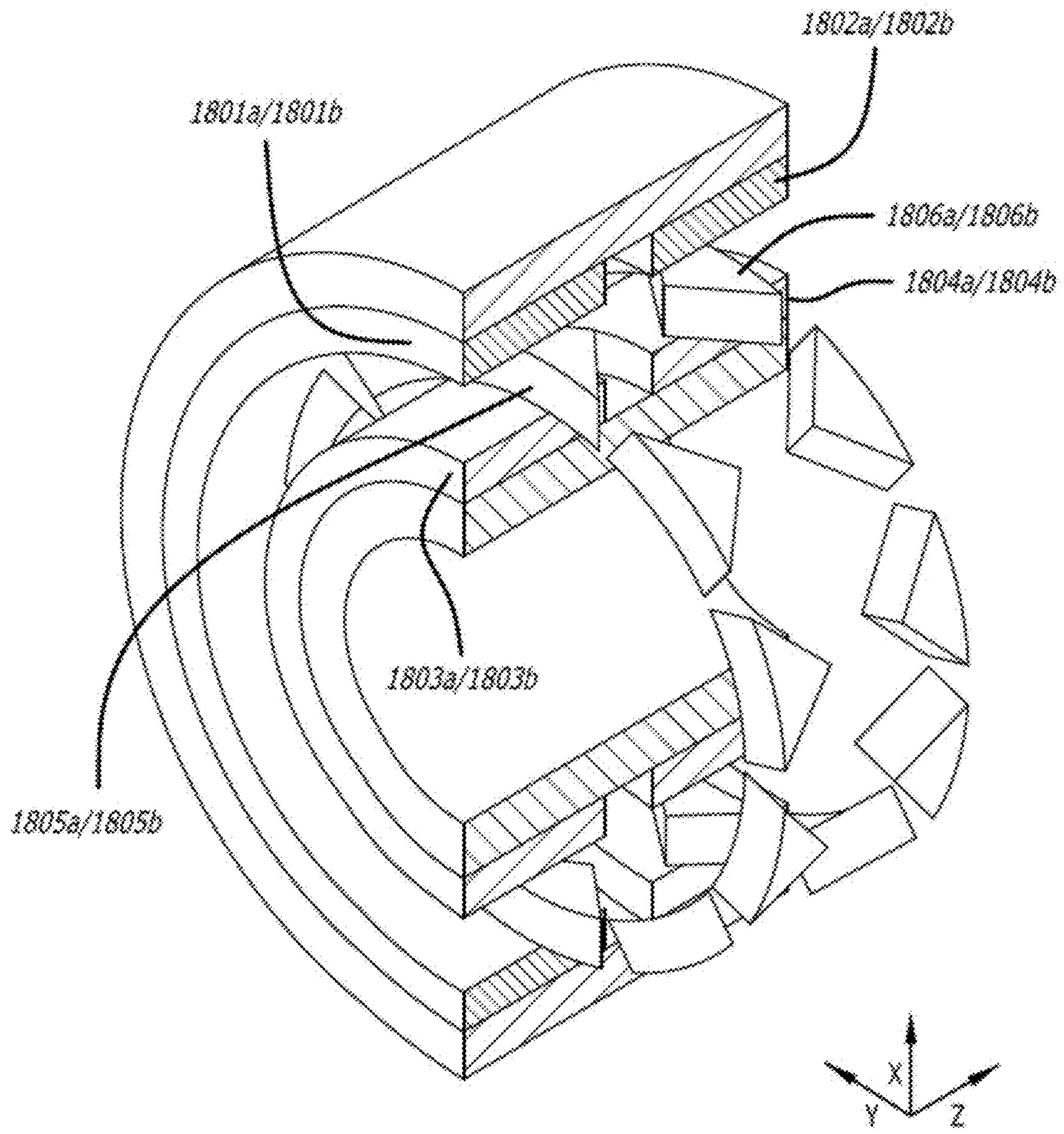
FIG. 2A (prior art)
FIG. 2A (which is FIG. 18D of the Pinkerton '633 PCT Application) is an illustration of a perspective view showing certain parts (mainly the permanent magnets) of a prior art repulsive/attractive MNS (which is shown in FIGS. 2C-2E).
Figure 2B:
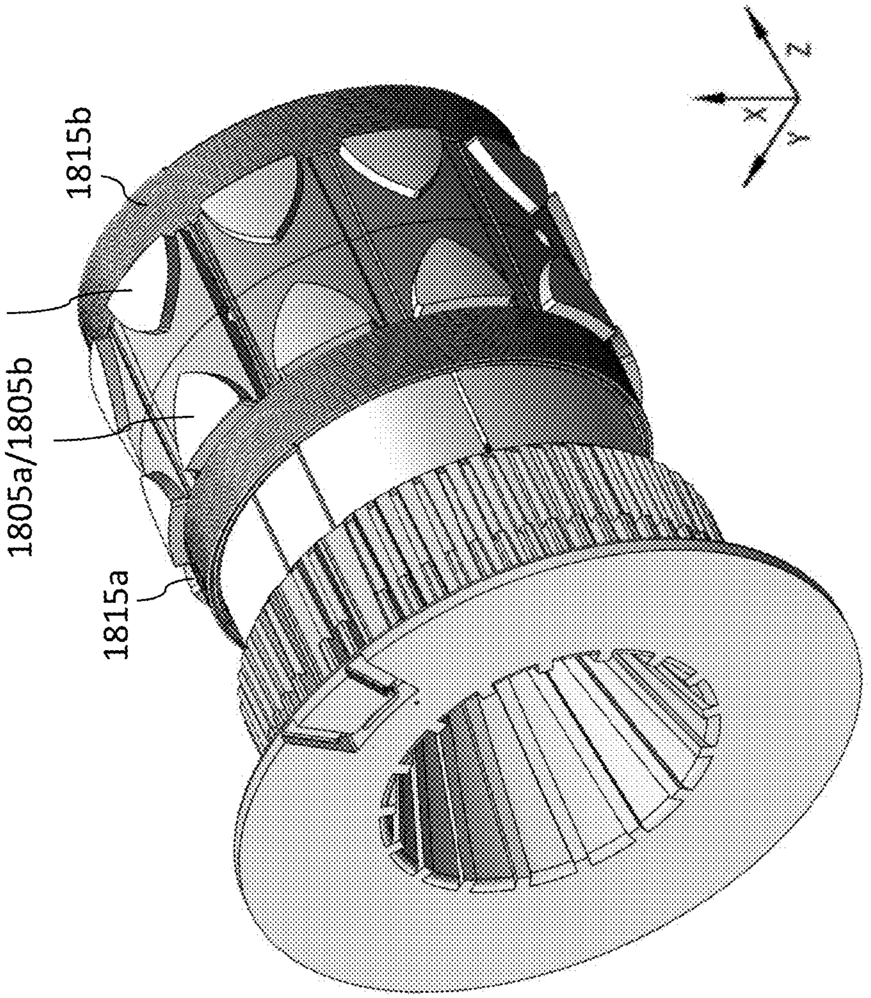
FIG. 2B (prior art)
FIG. 2B is an illustration of a perspective view of the armature that was utilized in the prior art repulsive/attractive MNS shown in FIG. 2A.
Figure 2C:
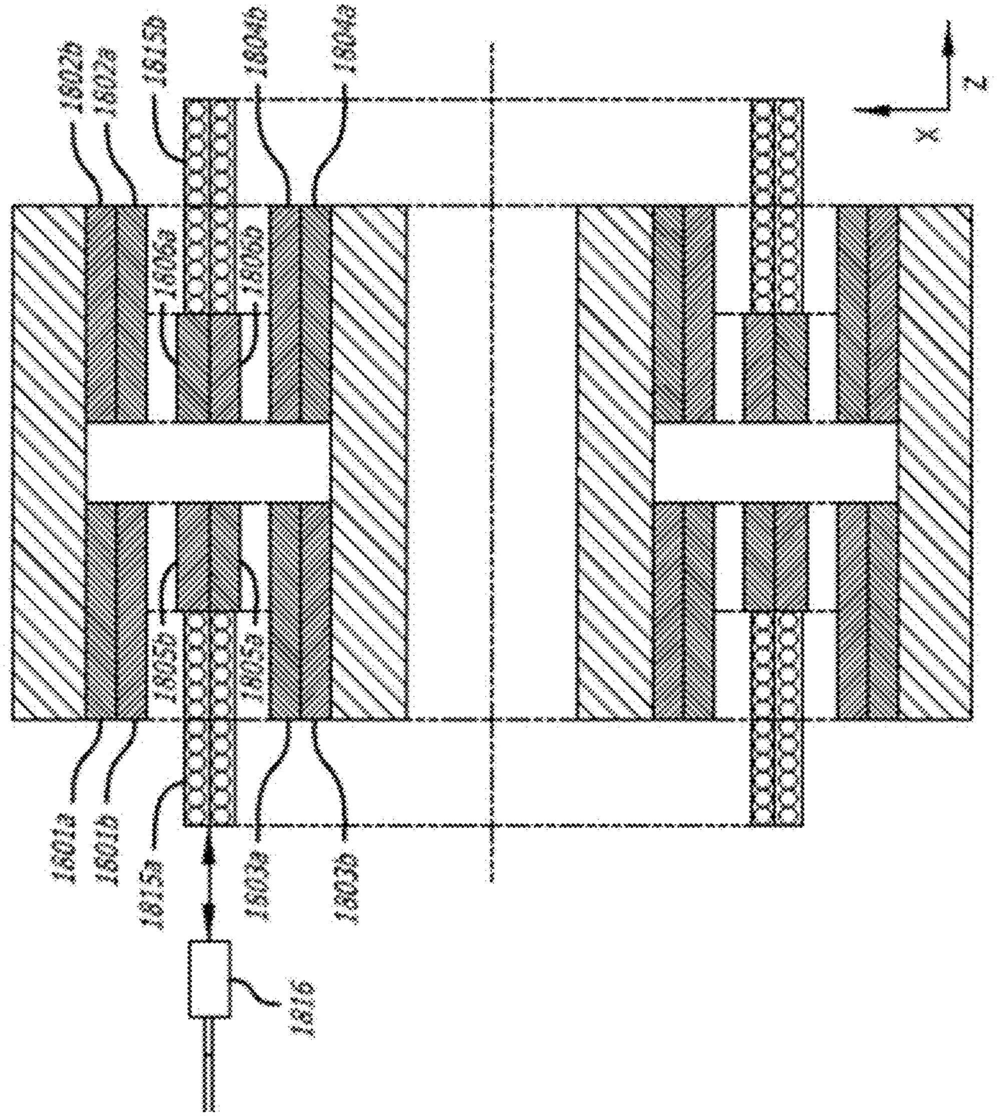
FIG. 2C (prior art)
FIGS. 2C-2E (which are, respectively, FIGS. 18A-18C of the Pinkerton '633 PCT Application) are schematics of a cross-sectional view of an embodiment of a prior art repulsive/attractive MNS with the voice coil armature in various positions (centered, partial negative z-direction, centered, and full negative z-direction, respectively).
Figure 2D:
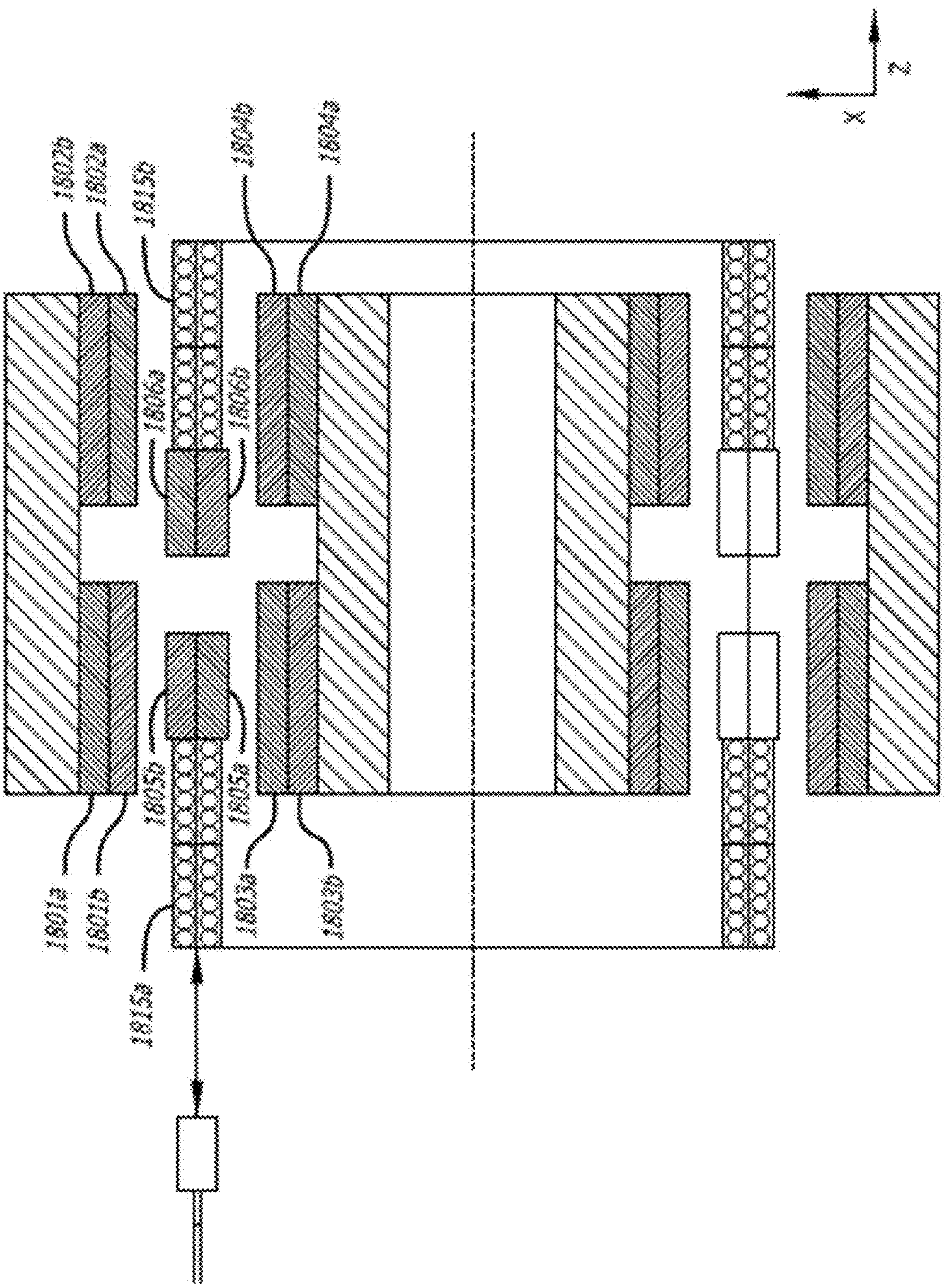
FIG. 2D (prior art)
Figure 2E:
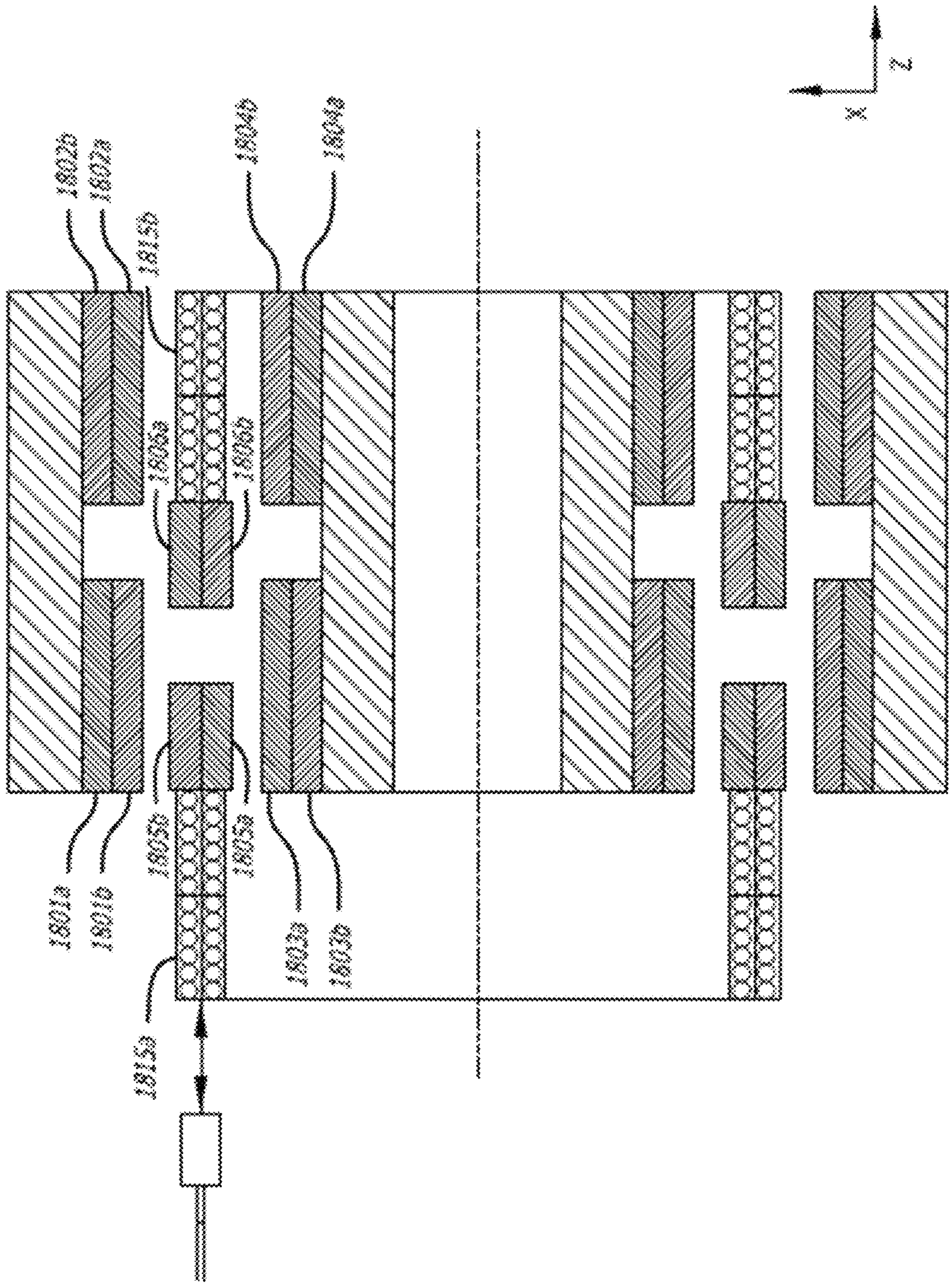
FIG. 2E (prior art)
Figure 3:
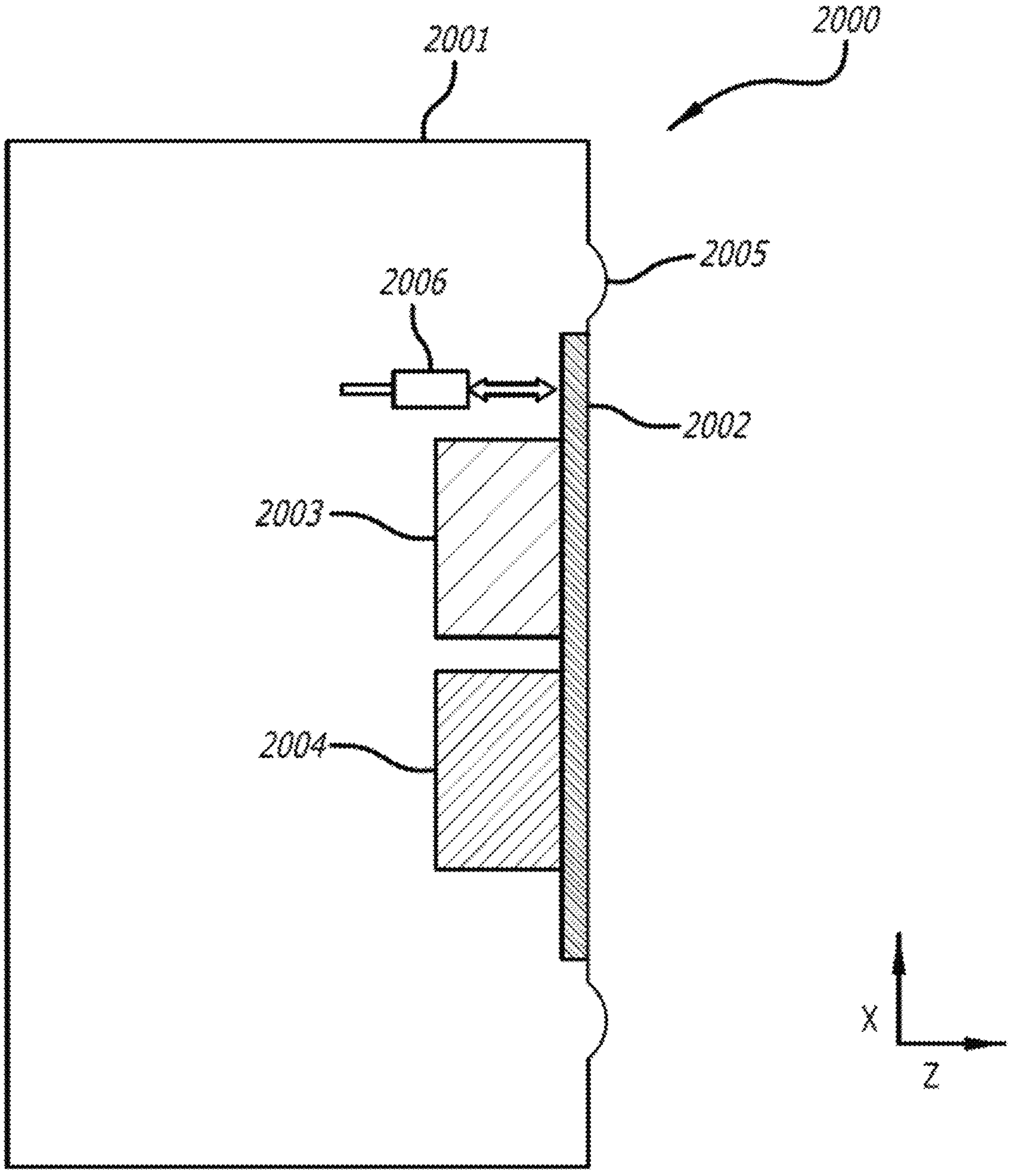
FIG. 3 (prior art)
FIG. 3 (which is FIG. 20 of the Pinkerton '633 PCT Application (with a change of orientation of the z-axis)) is a schematic of a loudspeaker in which an MNS (such as shown in FIG. 2A) can be utilized.
Figure 4:
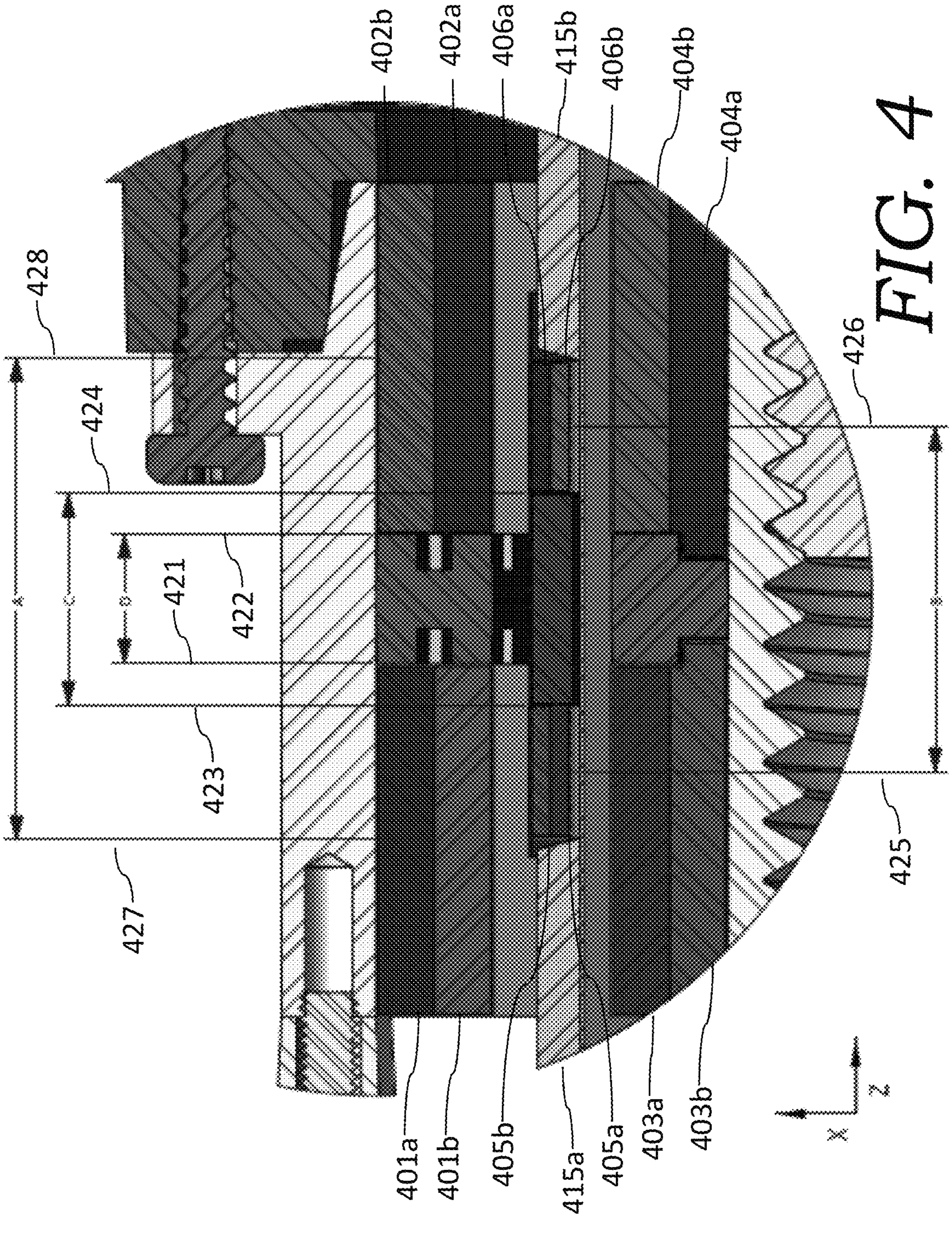
FIG. 4 is an illustration of a repulsive/attractive MNS in an embodiment of the present invention.

FIG. 4 shows a repulsive/attractive MNS that is similar to the repulsive/attractive MNS shown in FIGS. 2A-2E and described above (and further described in the Pinkerton '633 PCT Application) with several modifications.

It has been discovered that radial stability has been improved by having the minimum distance (C) between the armature magnets 405*a*-405*b* to 406*a*-406*b* to be greater than the minimum distance (D) between the stator magnets 401*a*-401*b* to 402*a*-402*b* and between the stator magnets 403*a*-403*b* to 404*a*-404*b*. Distance C is measured between (i) the inner edge of armature magnets 405*a*-405*b*, which is indicated by line 423, and (ii) the inner edge of armature magnets 406*a*-406*b*, which is indicated by line 424. (In the orientation of FIG. 4, "inner edge" refers to the edge closer to the center, while "outer edge" refers to the edge farther from the center). Distance D is measured between (i) the inner edge of stator magnets 401*a*-401*b*, which is indicated by line 421, and (ii) the inner edge of stator magnets 402*a*-402*b*, which is indicated by line 422.

This design improves radial stability since the left armature magnet 405*a*-405*b* has more axial distance to travel before it enters the main magnetic field of the right stator magnets 402*a*-402*b* and 404*a*-404*b* when the armature is moving to the right (i.e., the positive z-direction). (The left armature magnet 405*a*-405*b* is attracted to the right stator magnets 402*a*-402*b* and 404*a*-404*b* and this can cause radial instability once the armature magnet 405*a*-405*b* enters the main stator field). Having the centerlines 425-426 for armature magnets 405*a*-405*b* and 406*a*-406*b*, respectively, inboard of the centerlines 427-428 for stator magnets 401*a*-401*b* to 402*a*-402*b*, respectively, also allows for more room in the stator field for the voice coils 415*a*-415*b*. Distance A is measured between (i) centerline 427 of stator magnets 401*a*-401*b*, and (ii) centerline 428 of stator magnets 402*a*-402*b*. Distance B is the measured between (i) centerline 425 of armature magnets 405*a*-405*b* and (ii) the centerline 426 of armature magnets 406*a*-406*b*.

In embodiments of the present invention, the stator magnets can be stator ring magnets that can be round or non-round shapes (like ellipses).

Linear Force

MNS force vs displacement curve has been non-linear and thus can result in audible distortions in the speaker sound output. In addition to improving radial stability, the above design shown in FIG. 4 also provides a generally linear force.

Figure 5A:
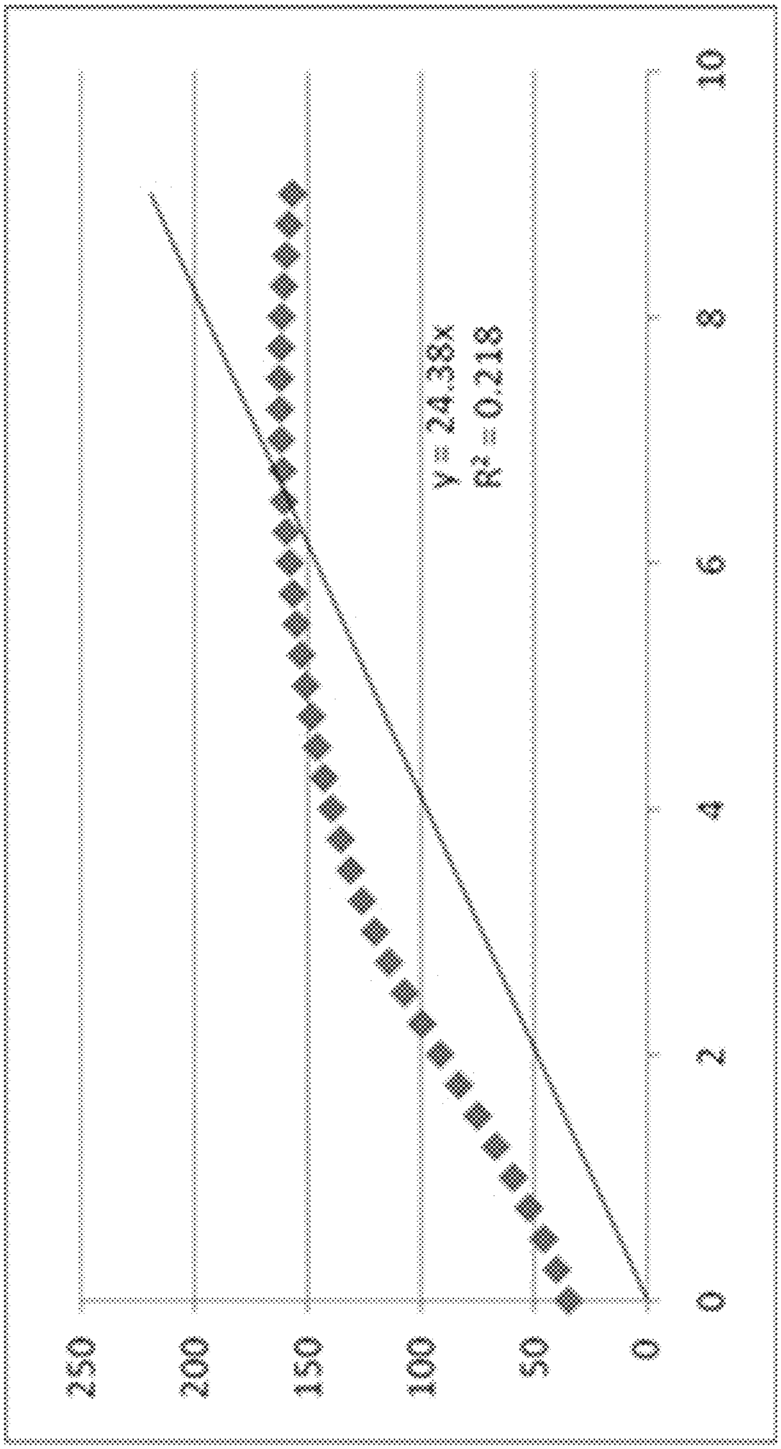
FIGS. 5A-5C show, respectively, (A) axial force of the left armature magnet, (B) axial force of the right armature magnet, and (C) sum of axial forces of the left and right armature magnets.
Figure 5B:
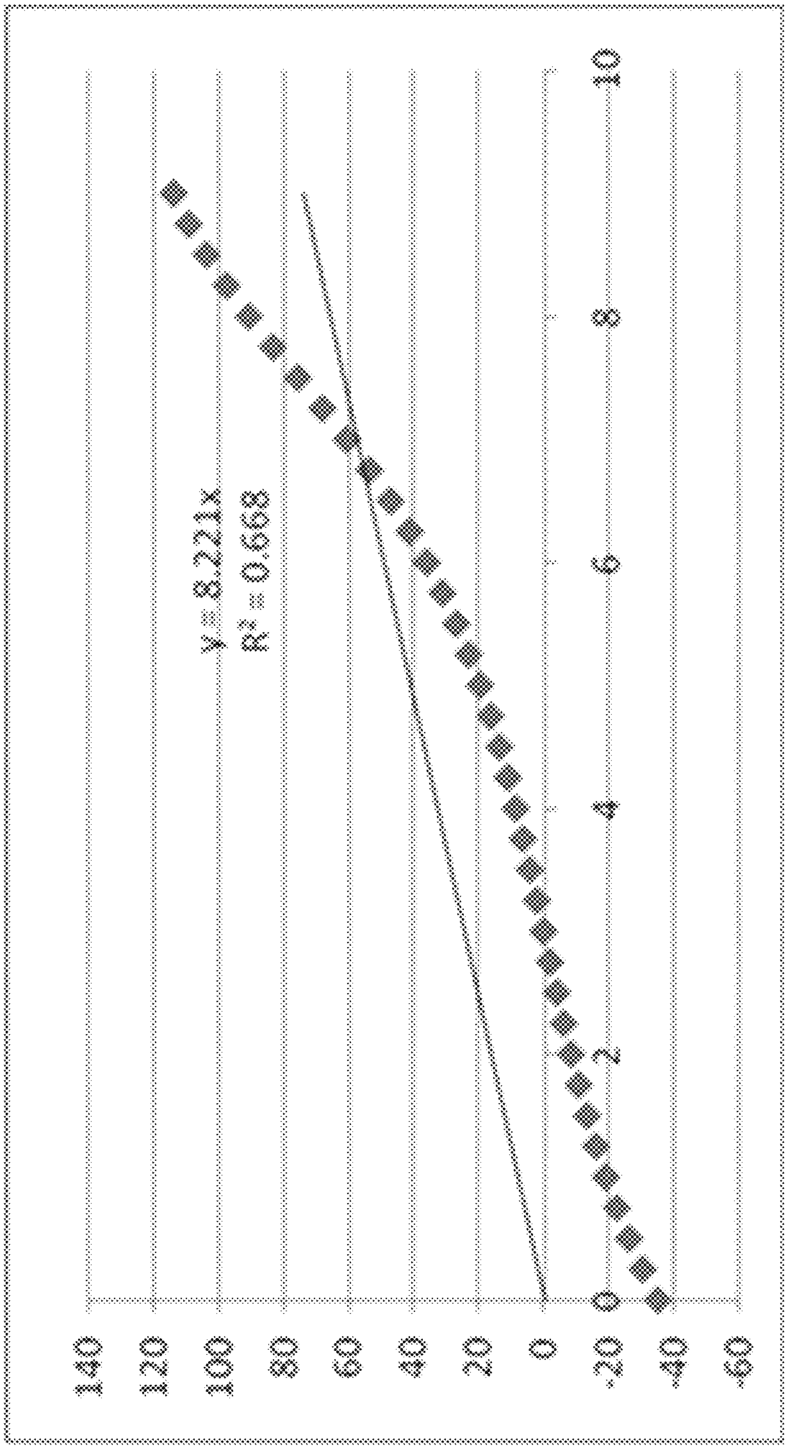
Figure 5C:
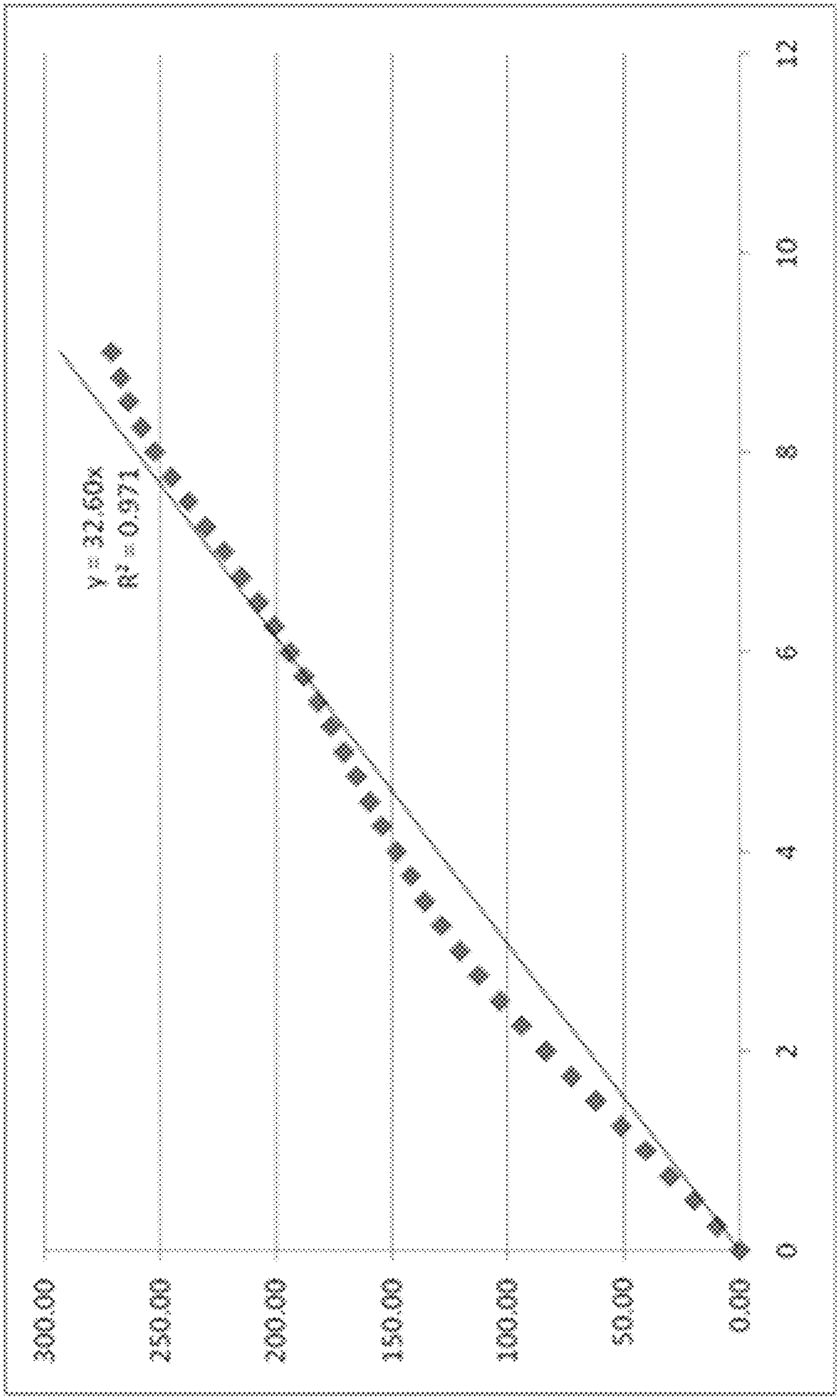

FIG. 5A shows the axial force of the left armature magnet 405*a*-405*b*, and FIG. 5B shows the axial force of the right armature magnet 406*a*-406, both of which are non-linear. However, when these axial forces shown in FIGS. 5A-5B are added together, as shown in FIG. 5C, this sum is highly linear. Stated a different way, the correlation coefficient of the line in FIG. 5C ($R^2$=0.971) is greater than the line in FIG. 5A ($R^2$=0.218) and also greater than the line in FIG. 5B ($R^2$=0.668). This surprising and remarkable result is achieved when the distance between the centerline (B) of the armature magnets is less than the centerline (A) of the stator magnets, which results in oppositely directed armature magnet forces that basically cancel to zero when the armature is centered (as shown by FIG. 5C). The linearity of the force curve is further enhanced when the minimum distance (C) between the armature magnets is greater than the minimum distance (D) of the stator magnets (D), as shown in FIG. 4.

Inner Stator Arc Segments

Figure 6:
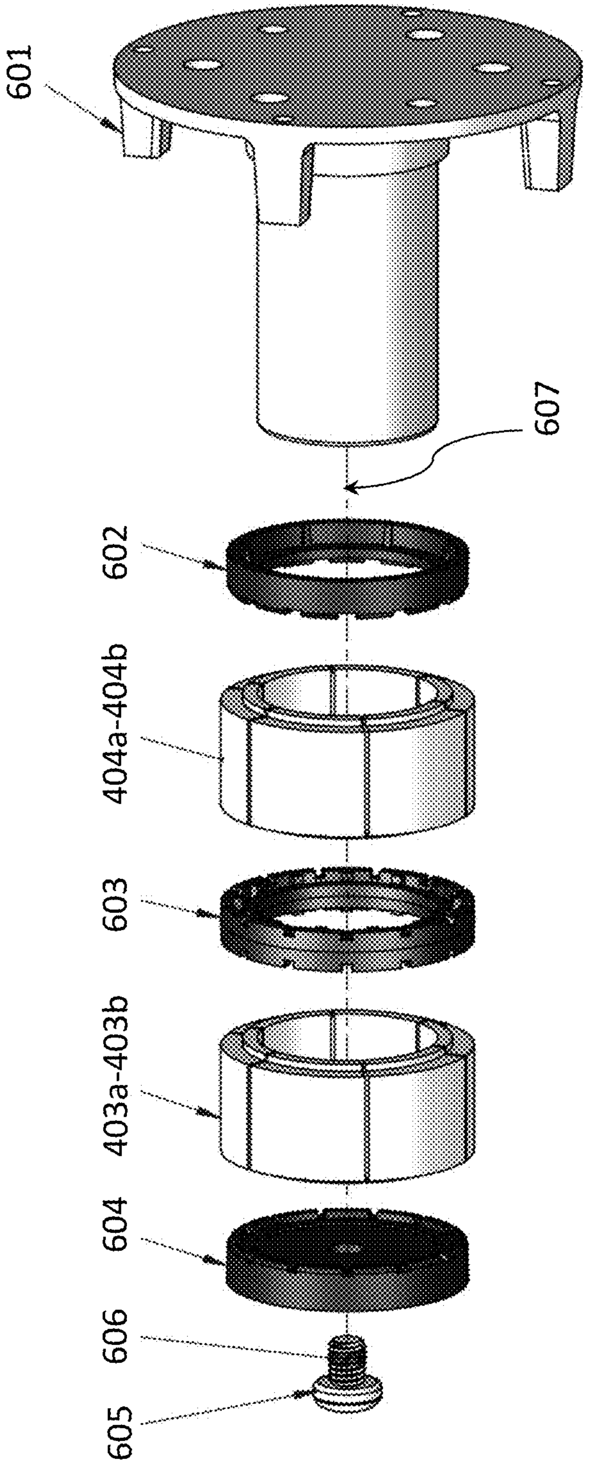
FIG. 6 shows a perspective view of certain parts of a repulsive/attractive MNS in an embodiment of the present invention.

Still further, the inner stator magnet arc segments have overcome epoxy bonds and broken free. FIG. 6 (along with FIG. 4) show how the inner stator magnets 403*a*-403*b* and 404*a*-404*b* can be locked into place by making the magnet arc segments with a ridge that locks into three non-magnetic (such as plastic) parts 602-604 along longitudinal axis 607. (Nut 605 with threads 606 can couple with inner steel core 601 to lock these in place). This prevents the arc segments from breaking free from the inner steel core (even when little or no epoxy is used between the magnets and steel).

Altitude/Resonance Frequency

Also, it has been discovered that operating a RAD-based speaker at altitudes above about 2000 feet can prevent the RAD from working (i.e., a RAD-based speaker can become unstable at altitudes that are substantially above sea level). The net stiffness of a RAD is:

net stiffness=air pressure force+mechanical support force−the axial MNS force.

Figure 7:
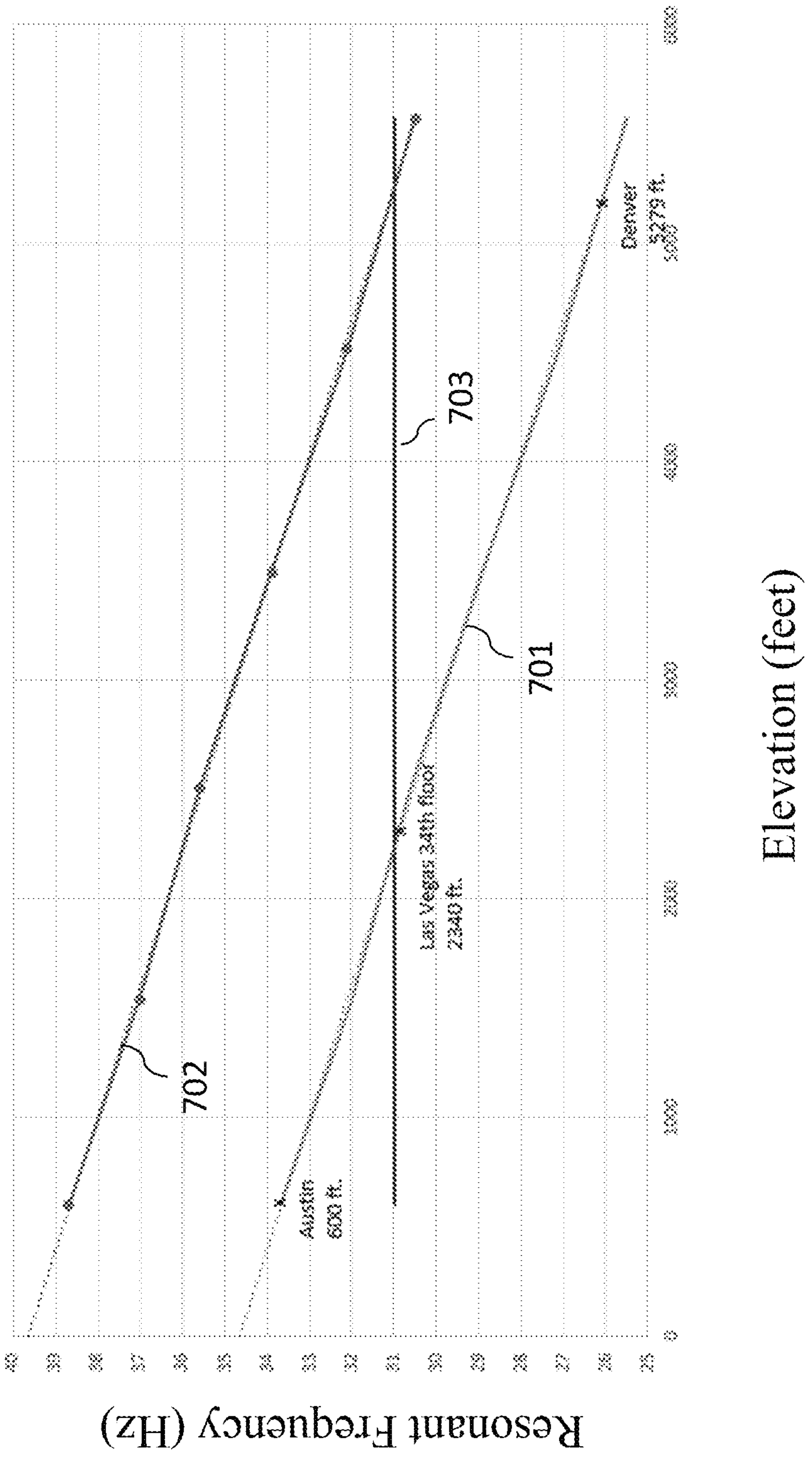
FIG. 7 shows the effect of altitude on stability of a repulsive/attractive MNS.

Accordingly, the net stiffness of a RAD decreases when the air pressure force decreases (and the air pressure force decreases as atmospheric pressure drops). Line 701 in FIG. 7 shows the effect of altitude on RAD stability (with resonant frequency at 33.7 Hz in Austin, Texas and 26.2 Hz in Denver, Colorado). Line 703 (31 Hz) is the lower resonant frequency below which the RAD becomes unstable. This problem of instability can be solved by increasing the mechanical support stiffness, as shown in line 702 (which results in resonant frequency at 38.7 Hz in Austin, Texas and 31 Hz in Denver, Colorado). However, this change in mechanical stiffness can decrease the sound pressure level of low subwoofer notes.

It has been discovered that a better way to address this problem is with an internal bellows that can expand to increase the stiffness of the air pressure force to compensate for a drop in atmospheric pressure. An internal pressure sensor can sense atmospheric pressure and instruct the bellows to expand or contract to produce the ideal air pressure stiffness.

Figure 8A:
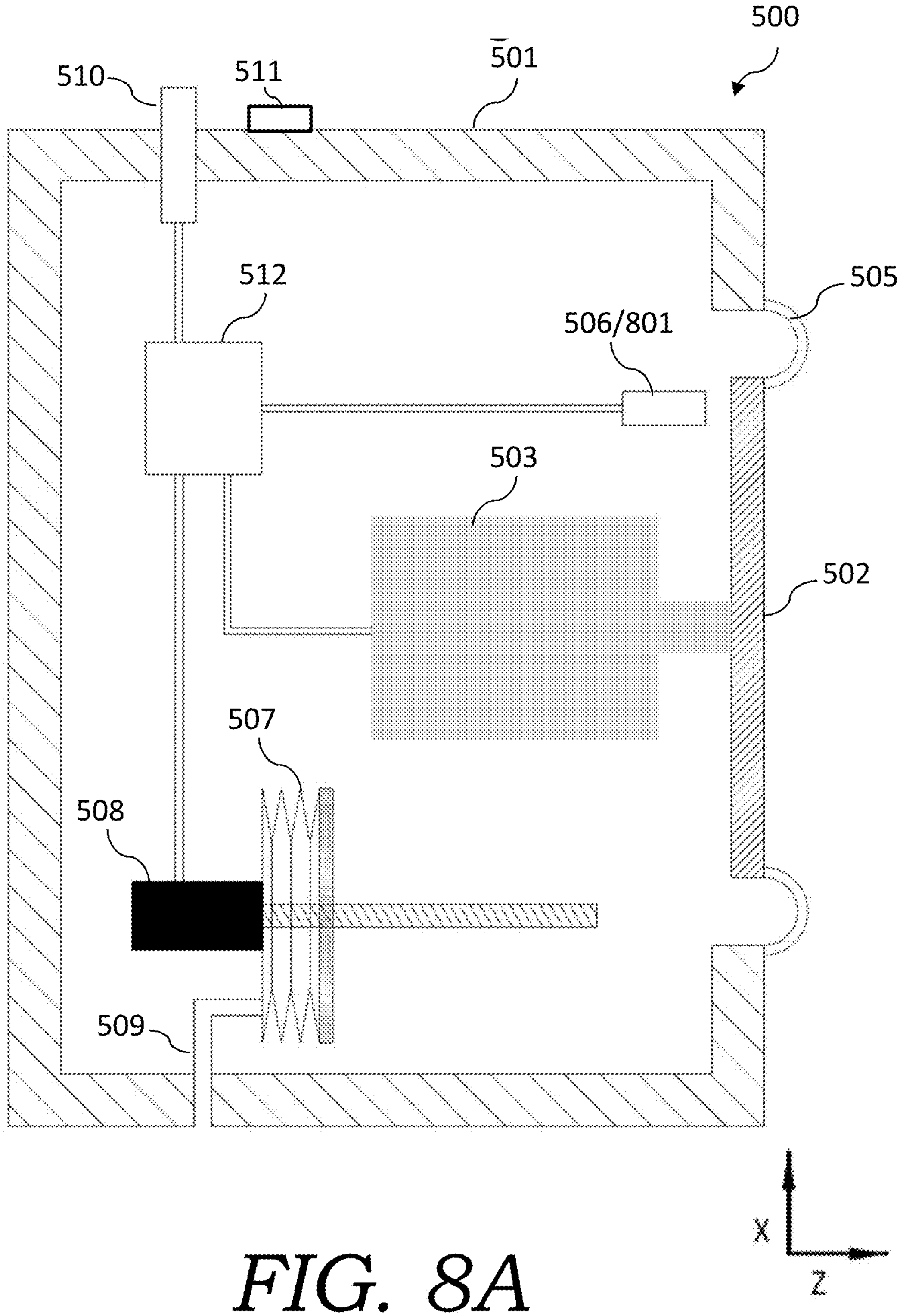
FIGS. 8A-8B are schematics of a prior art loudspeaker showing, respectively, a contracted and expanded bellow.
Figure 8B:
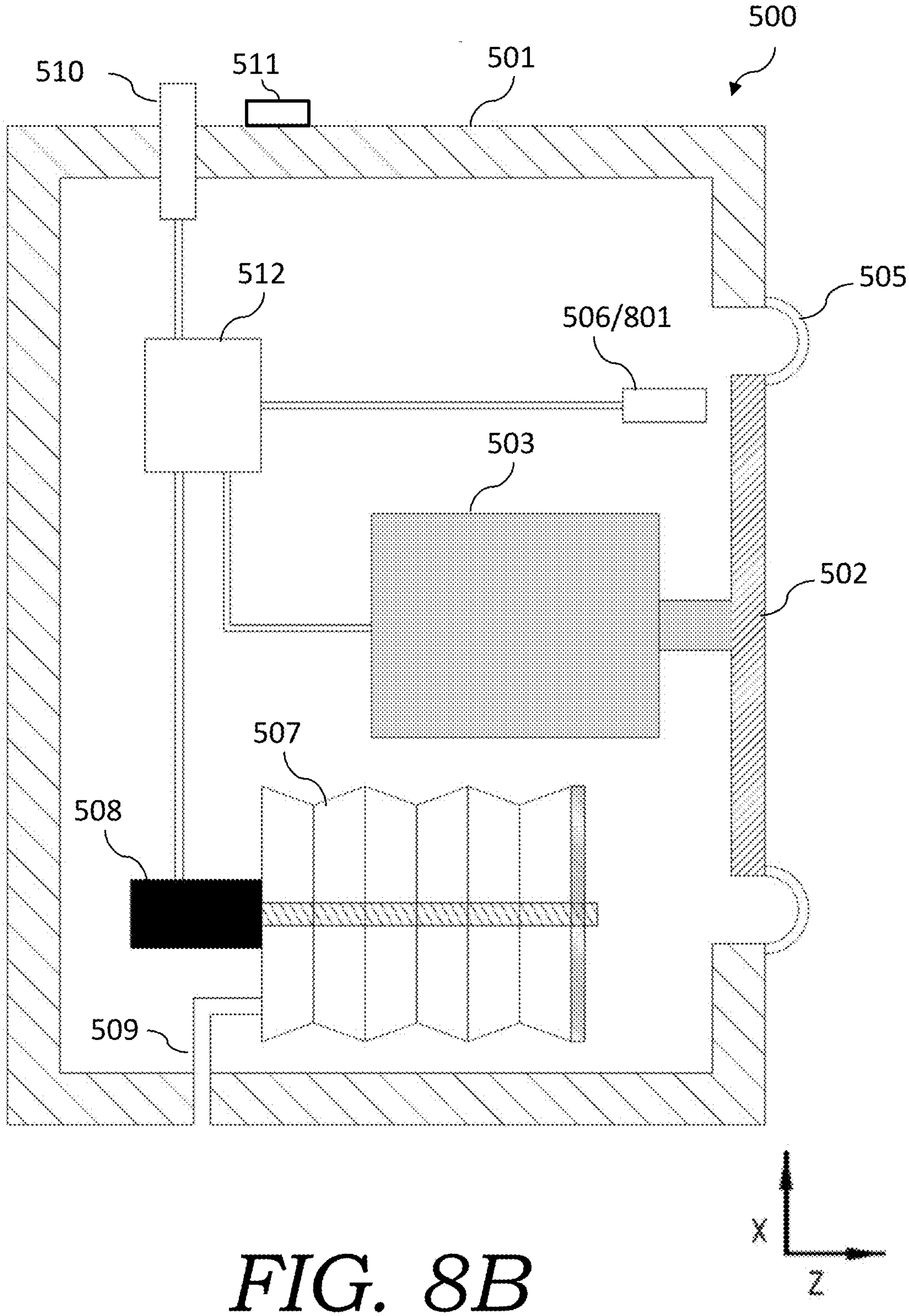

Such design for a bellows can be similar to that as described in the Pinkerton '747 PCT Patent except that sensor 506 can further include a sensor 801 for sensing atmospheric pressure. To adjust the internal air volume (and thus the resonant frequency) of the loudspeaker a variable volume device (or system) can be used that includes an internal bellows with an associated motor to adjust the volume of the bellows. FIGS. 8A-8B show a loudspeaker 500 having a sealed chamber (or sealed enclosure) 501, a movable sound panel 502, (which is connected to a flexible "surround" element 505, such as made from rubber to allow movable sound panel 502 to move in the positive and negative z-direction). Loudspeaker 500 further includes armature assembly 503 (including the MNS and voice coil), which is positioned for moving movable sound panel 502 in the positive and negative z-direction. Loudspeaker 500 further includes sensor 506 (such as position and/or velocity sensor, that can be an optical or inductive sensor) and pressure sensor 801 used to sense atmospheric pressure, which sensors provide feedback to electronic controller 512. In the orientation of FIGS. 8A-8B (shown by the x-z axis shown therein, with the y-direction perpendicular thereto), movable sound panel 502 moves outward and inward in the z-direction due to the z-direction movement of the armature. Such movement occurs due to the voice coil and magnetic negative spring forces generated thereby.

Loudspeaker 500 further includes a variable volume device, such as bellows 507, with an associated motor 508

(for adjusting the volume of bellows 507). Air outside loudspeaker 500 can flow in and out of bellows 507 (to permit the bellows to contract or expand) via conduit 509. FIG. 8A shows bellows 507 when contracted, and FIG. 8B shows bellows 507 when expanded. Expanding or contracting bellows 507 will temporarily increase or decrease the internal air pressure of the chamber but this pressure will equilibrate in a few seconds given any small air leaks that exist in sealed chamber 501. Electronic controller 512, a pump-valve 510 can also be utilized to facilitate and control this pressure equalization by pumping air into or out of sealed chamber 501 to create positive, negative or near zero pressure within sealed chamber 501. Increasing the stiffness of the chamber air spring constant (by decreasing the chamber air volume with an expanded bellows 507 like shown in FIG. 8B) will increase the resonant frequency. Decreasing the air chamber spring constant (by increasing the chamber air volume with a contracted bellows 507 like shown in FIG. 8A) will decrease the resonant frequency. Thus, the resonant frequency can be controlled using electronic controller 512 by controlling the degree to which the bellows is expanded/contracted. Loudspeaker 500 can also have a microphone 511, which, in addition to the typical/standard uses of speaker microphones, can be used for determining and controlling resonant frequency.

Figure 9A:
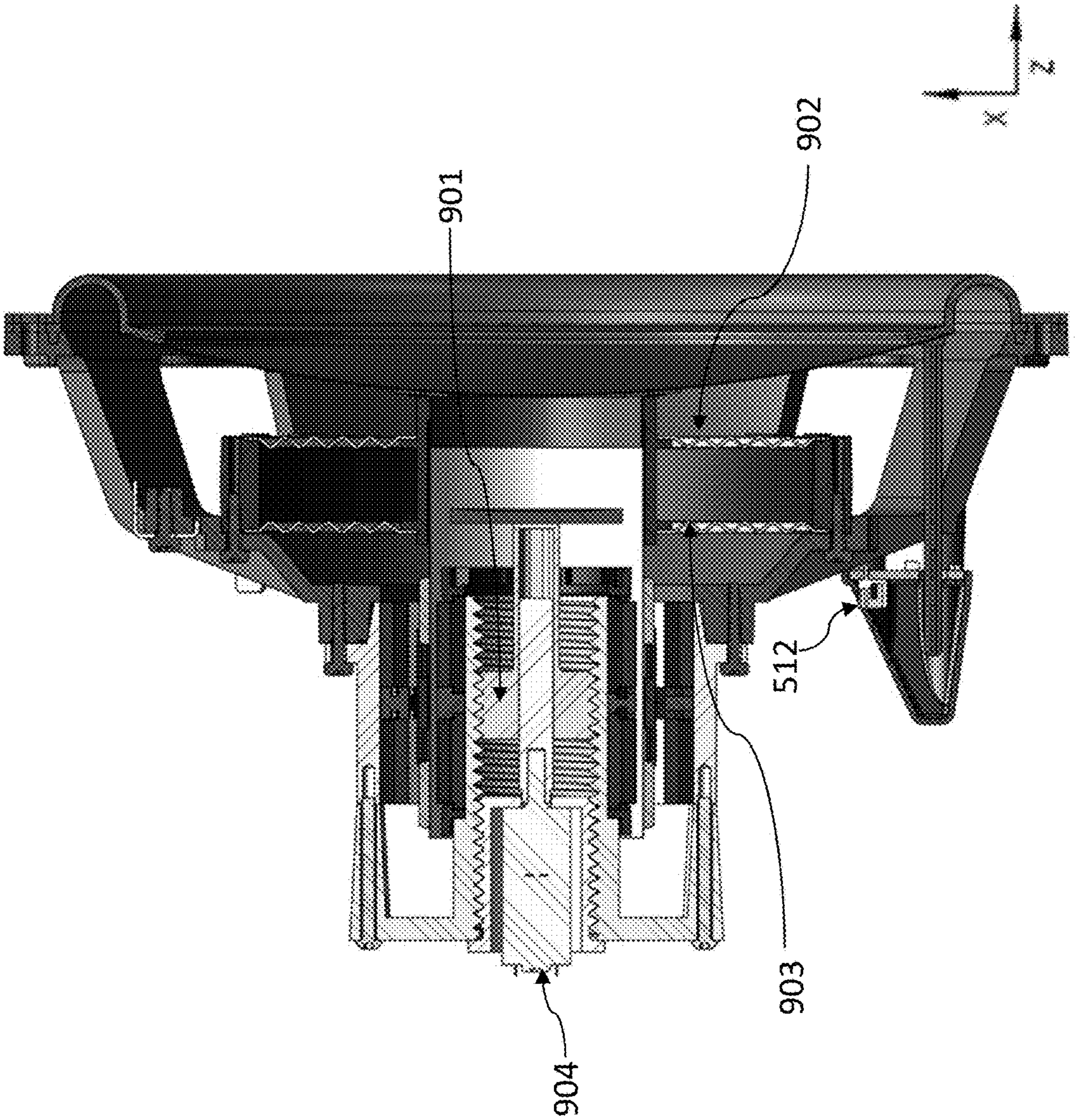
FIGS. 9A-9C are illustrations showing a repulsive/attractive MNS having a movable ferromagnetic plunger.
Figure 9B:
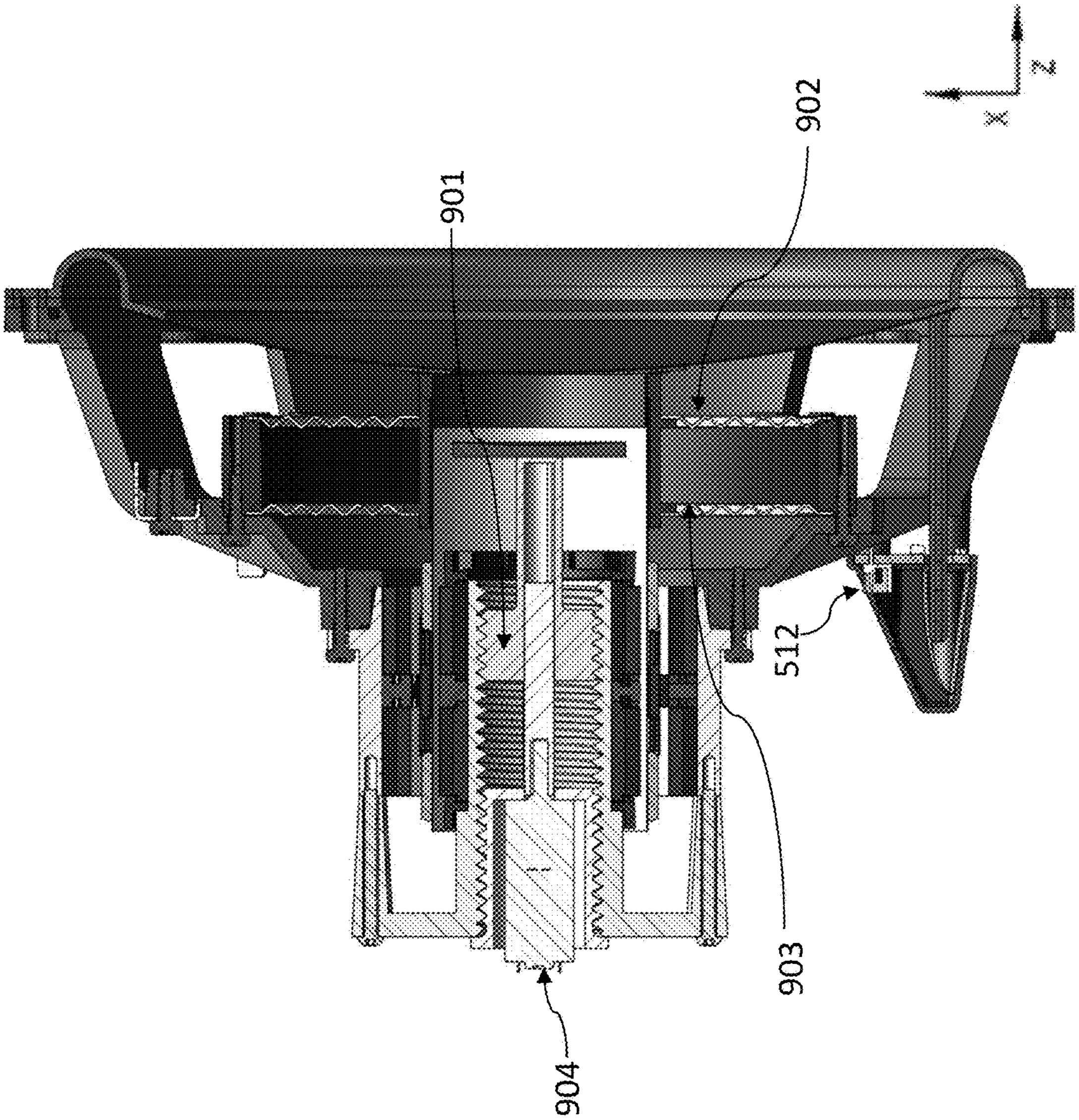
Figure 9C:
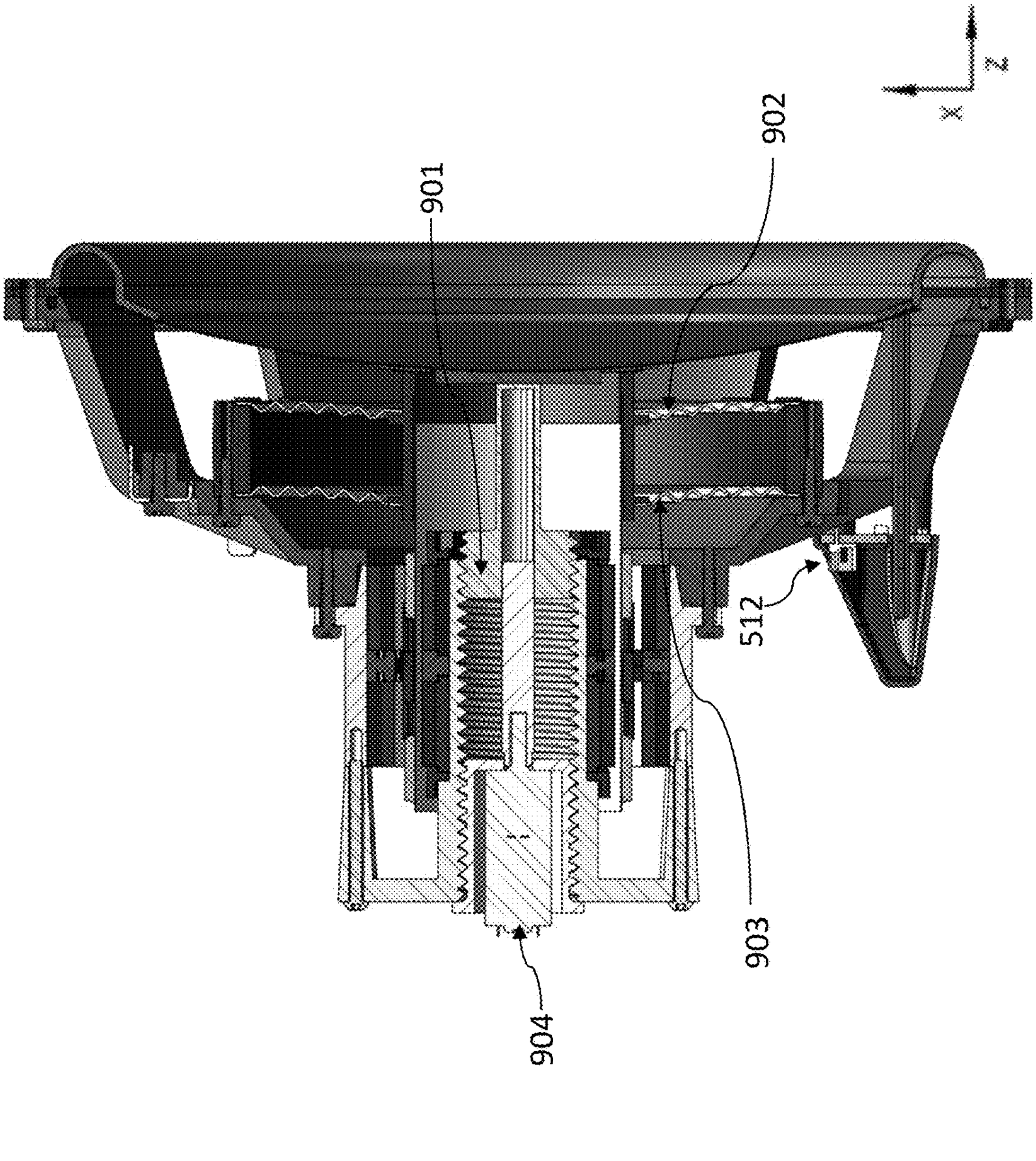

Alternatively, a more compact way to compensate for changes in atmospheric pressure is shown in FIGS. 9A-9C. In this case a moveable ferromagnetic (such as steel) plunger 901 is used to adjust the magnetic stiffness of the MNS to compensate for changes in atmospheric pressure (by increasing or decreasing the reluctance of the stator magnetic circuit). In the FIG. 9A, the steel plunger 901 is centered and this maximizes the magnet force and stiffness of the MNS (the plunger 901 is in its minimum reluctance position). FIG. 9B shows the plunger as it is moved to the right (positive z-direction) of center and this reduces the magnetic force/stiffness of the MNS and is ideal for high altitude conditions. In FIG. 9B, plunger 901 is near its maximum reluctance position. A pressure sensor 801 (that can be located on the circuit board 512 of position sensor 506) can be used for feedback to the gear-motor 904 that moves the ferromagnetic (preferably steel) plunger 901.

Support Force

When the RAD is off and in its off/resting position it can create an asymmetry in the "spider" support force (that limits displacement and can cause instabilities).

The variable reluctance mechanism shown in FIGS. 9A-9C and described above can also be used to compensate for manufacturing variances in magnet strength and mechanical support stiffness (the spiders and the rubber surround). FIGS. 9A-9C also show two axially spaced spiders 902-903 that help provide radial stability to the RAD.

The resonance frequency of the RAD can be quickly and automatically determined (such as by an algorithm) and this information can be used to adjust the plunger position at the time of manufacture. For example, the algorithm can inject a sine wave voltage with a given zero crossing into the voice coil and the zero crossing of the resulting current sine wave can be measured. When the time lag between the voltage zero crossing and the current zero crossing is at or near zero the frequency (which is the resonant frequency) is noted as the measured resonant frequency. The ferromagnetic plunger 901 can then be moved until the measured resonant frequency matches the target resonant frequency. This algorithm can be used, for instance, every few months to compensate for changes in mechanical support stiffness (which tends to drop over time).

While it is likely a pressure sensor will be used to determine atmospheric pressure, this algorithm can also be used to indirectly measure atmospheric pressure by noting a change in RAD resonant frequency and instructing the gear-motor to move the steel plunger 901 to a location that results in the measured resonant frequency matching the target resonant frequency (the difference between the initial and target frequency can be used to calculate a change in atmospheric pressure).

The plunger 901 can also be moved to minimize the power consumption of a given song by matching the voice coil resonant frequency with the song's primary low frequency note (an algorithm can scan the song file to determine its primary low frequency note).

The ferromagnetic/steel plunger mechanism can do double duty as a launch/land pad for the RAD sound panel as shown in FIG. 9C. When the speaker is off the panel/cone can land on the pad just 1-2 mm to the left of center. This position significantly reduces the strain on the mechanical supports relative to the current off position of approximately minus 10 mm and also reduces any strain-induced changes in RAD resonant frequency.

Importantly, the launch position of the RAD sound panel/cone is when the plunger 901 is in a position that maximizes stability for any altitude (by minimizing magnetic force/stiffness). This design allows the RAD to be stable at any altitude when launched and then the magnetic force/stiffness can be increased from that point depending on the atmospheric pressure and condition of the mechanical support.

Cancellation of Axial Mechanical Vibrations

Figure 10A:
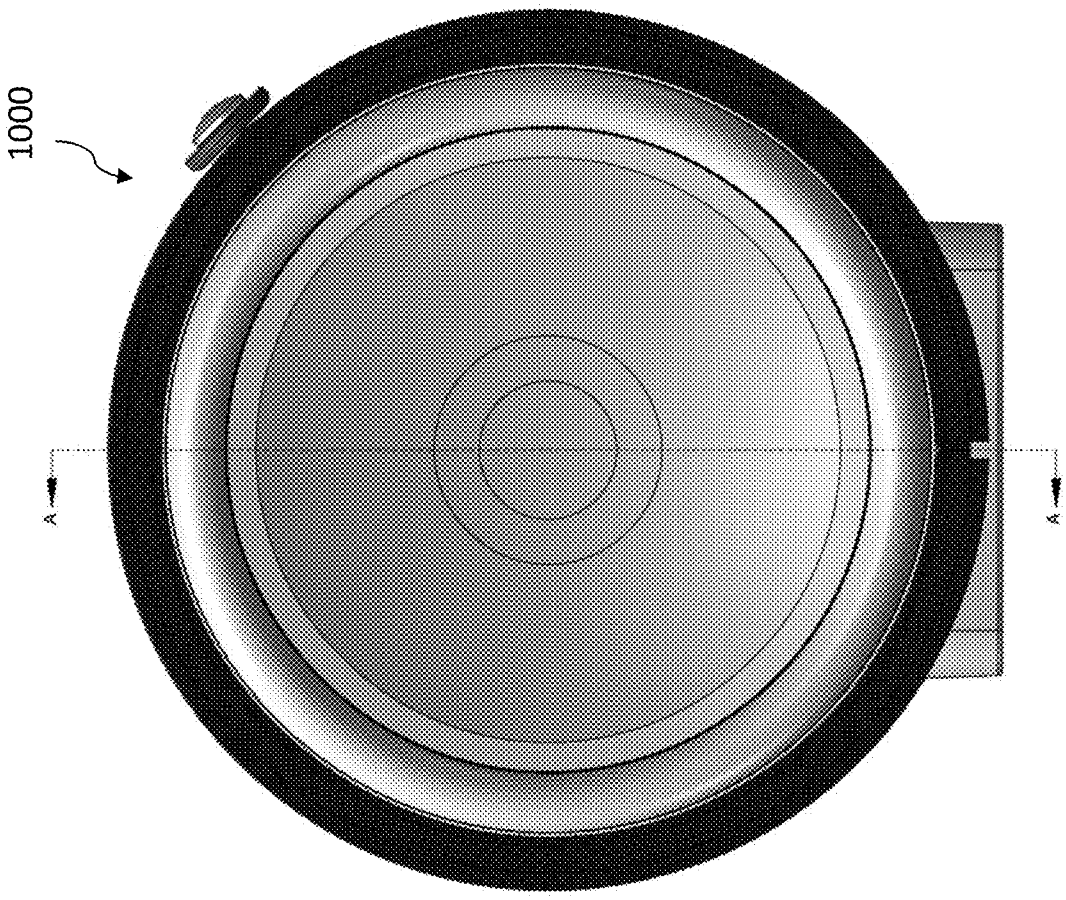
FIGS. 10A-10B are illustrations showing a loudspeaker having two RADs of the present invention.
Figure 10B:
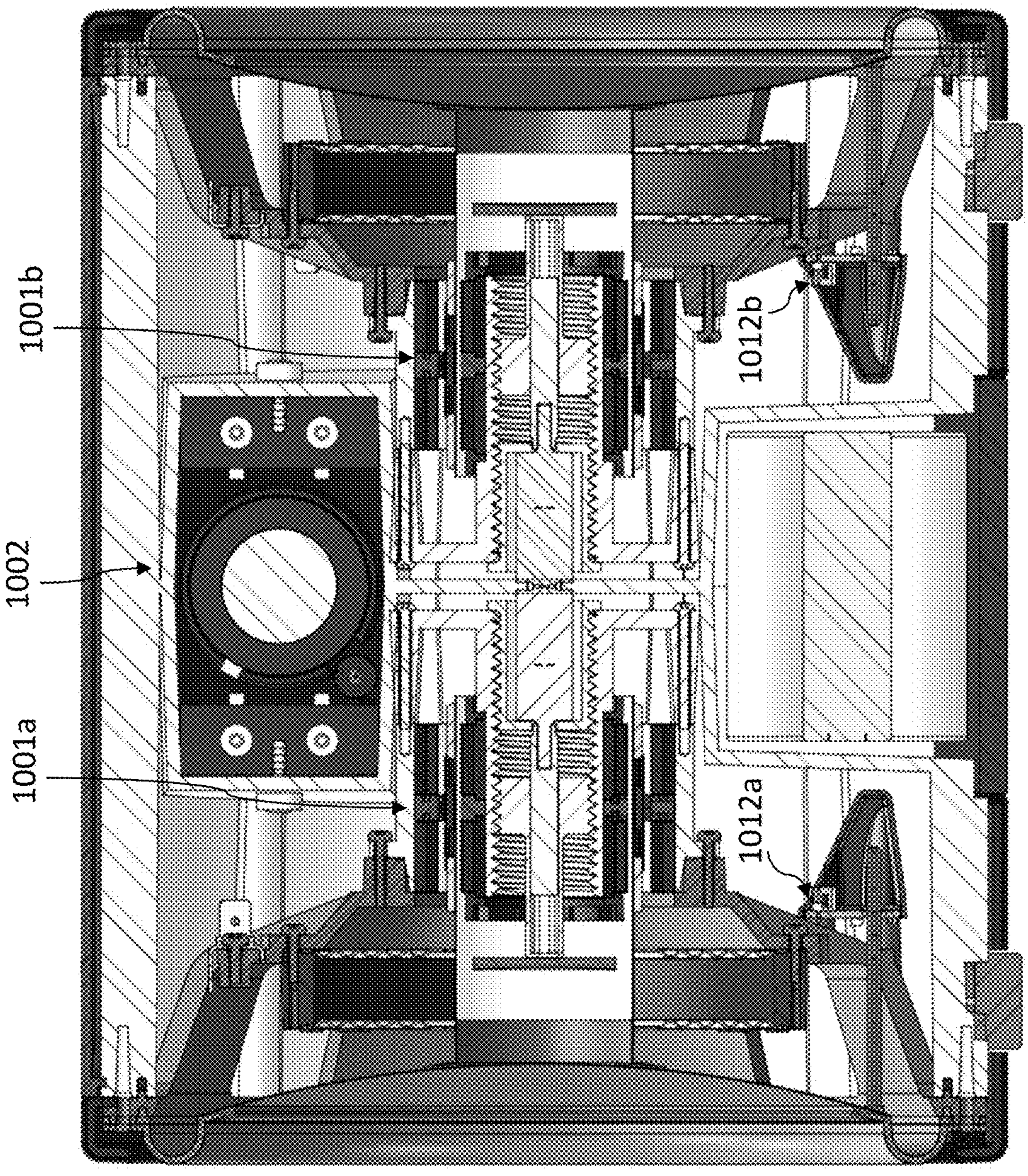

FIGS. 10A-10B shows a speaker 1000 with two RADs 1001*a*-1001*b* that are positioned so that their axial mechanical vibrations cancel. It also shows an air pump 1002 with air valves that can be used if the sound panel/cone accidentally moves outward or the plunger mechanism fails to move the launch/land pad toward the cone/panel. In this case the pump and valves can be used to pull the cone/panel inward (with a vacuum) and also gently launch or land the RAD cone/panel (with positive pressure). A pressure sensor can be located on each of the two circuit boards 1012*a*-1012*b* near the position sensor.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A loudspeaker comprising:

(a) an enclosure;

(b) a sound panel mechanically connected to the enclosure;

(c) a moveable armature mechanically connected to the sound panel comprising an actuator operable to convert electrical energy into mechanical energy, wherein the moveable armature is operable for moving the sound panel toward the enclosure to create a first air pressure force and away from the enclosure to create a second air pressure force; and (d) a magnetic negative spring that has a first magnetic negative spring portion that is mechanically connected to the moveable armature and a second magnetic negative spring portion that is stationary relative to the enclosure, wherein (i) the magnetic negative spring is operable to provide a first magnetic negative spring force when the sound panel is moving toward the enclosure and a second magnetic negative spring force when the sound panel is moving away from the enclosure, (ii) the first magnetic negative spring force is oppositely directed to the first air pressure force, (iii) the second magnetic negative spring force is oppositely directed to the second air pressure force, (iv) the first magnetic negative spring portion is comprised of a first armature magnet with a first axial midpoint and a second armature magnet with a second axial midpoint, wherein the first armature magnet and the second armature magnet are spaced apart by a first axial distance, (v) the second magnetic negative spring portion is comprised of a first ring magnet with a third axial midpoint and a second ring magnet with a fourth axial midpoint, wherein the first ring magnet and the second ring magnet are spaced apart by a second axial distance, (vi) the first axial distance is greater than the second axial distance, and (vii) the axial distance between the first axial midpoint and the second axial midpoint is less than the axial distance between the third axial midpoint and fourth axial midpoint.

2. The loudspeaker of claim 1, wherein the enclosure is a sealed enclosure.

3. The loudspeaker of claim 1, wherein the actuator is a voice coil.

4. The loudspeaker of claim 3, wherein the voice coil and the magnetic negative spring share the same magnetic circuit.

5. The loudspeaker of claim 1, wherein the actuator is an electromagnet.

6. The loudspeaker of claim 1 further comprising a position sensor that senses the position of the sound panel.

7. The loudspeaker of claim 6, wherein the position sensor is an infrared position sensor.

8. The loudspeaker of claim 1, wherein the first ring magnet is comprised of an inner first ring magnet and an outer first ring magnet, wherein the inner first ring magnet has a smaller radius than the outer first ring magnet.

9. The loudspeaker of claim 8, wherein the second ring magnet is comprised of an inner second ring magnet and an outer second ring magnet, wherein the second inner ring magnet has a smaller radius than the second outer second ring magnet.

10. The loudspeaker of claim 9, wherein the inner first ring magnet and the inner second ring magnet are connected to a ferromagnetic element.

11. The loudspeaker of claim 10, wherein the inner first ring magnet and the inner second ring magnet are comprised of arc segments.

12. The loudspeaker of claim 11, wherein (a) the inner first ring magnet and the inner second ring magnet each have an inner radius portion and an outer radius portion;

(b) the inner radius portion has a first axial length;

(c) the outer radius portion has a second axial length; and (d) the first axial length is greater than the second axial length.

13. The loudspeaker of claim 12 further comprising at least one mechanical locking element that secures the inner first ring magnet and the inner second ring magnet to the ferromagnetic element.

14. The loudspeaker of claim 9, wherein the outer first ring magnet and outer second ring magnet are connected to a ferromagnetic element.

15. The loudspeaker of claim 1, wherein (a) the first armature permanent magnet comprises a first array of arc-shaped elements, and (b) the second armature permanent magnet comprises a second array of arc-shaped elements.

16. The loudspeaker of claim 1, wherein (a) the first armature permanent magnet is repelled by the first radially polarized ring magnet and attracted to the second radially polarized ring magnet; and (b) the second armature permanent magnet is attracted to the first radially polarized ring magnet and repelled by the second radially polarized ring magnet.

17. The loudspeaker of claim 1 further comprising an armature centering mechanism.

18. The loudspeaker of claim 1 further comprising a ring of ferromagnetic material, wherein the first ring magnet and the second ring magnet are mechanically attached to the ring of ferromagnetic material.

19. The loudspeaker of claim 1, wherein the magnetic negative spring produces a peak force of over 100 Newtons.

20. The loudspeaker of claim 1, wherein (a) the first armature magnet has a first force-displacement curve having a first correlation coefficient;

(b) the second armature magnet has a second force-displacement curve having a second correlation coefficient;

(c) sum of the first force-displacement curve and the second force-displacement curve has a third correlation coefficient;

(d) absolute value of the third correlation coefficient is greater than absolute value of the first correlation coefficient; and (e) the absolute value of the third correlation coefficient is greater than absolute value of the second correlation coefficient.

21. The loudspeaker of claim 1, wherein (a) the first armature magnet creates a first force when the sound panel is moving away from the enclosure;

(b) the second armature magnet creates a second force when the sound panel is moving away from the enclosure; and (c) absolute value of the first force is greater than absolute value of the second force.

22. The loudspeaker of claim 21, wherein the absolute value of the first force is on average greater than twice the absolute value of the second force when the sound panel moves away from the enclosure from its centered position to its maximum outward excursion.

23. The loudspeaker of claim 1, wherein (a) the first armature magnet creates a first force when the sound panel is moving toward the enclosure;

(b) the second armature magnet creates a second force when the sound panel is moving toward the enclosure; and (c) absolute value of the first force is less than absolute value of the second force.

24. The loudspeaker of claim 23, wherein the absolute value first force is on average less than half the absolute value of the second force when the sound panel moves toward the enclosure from its centered position to its maximum inward excursion.

25. The loudspeaker of claim 1, wherein (a) the first armature magnet creates a first force when the armature is centered;

(b) the second armature magnet creates a second force when the armature is centered; and (c) the first force is equal in magnitude and opposite in direction to the second force.

26. The loudspeaker of claim 1 further comprising two axially spaced apart flexible supports.

27. The loudspeaker of claim 1, wherein (a) the first armature magnet has a first armature magnet inner edge and a first armature magnet outer edge;

(b) the first ring magnet has a first ring magnet inner edge and a first ring magnet outer edge;

(c) the second armature magnet has a second armature magnet inner edge and a second armature magnet outer edge;

(d) the second ring magnet has a second ring magnet inner edge and a second ring magnet outer edge; and (e) distance between the first armature magnet inner edge and the second ring magnet inner edge is approximately equal to distance between the first armature magnet outer edge and the first ring magnet outer edge.

28. The loudspeaker of claim 27, wherein distance between the second armature inner edge and the first ring magnet inner edge is approximately equal to distance between the second armature magnet outer edge and the second ring magnet outer edge.

* * * * *